(12) United States Patent
Okazaki et al.

(10) Patent No.: US 7,079,177 B2
(45) Date of Patent: Jul. 18, 2006

(54) REMOTE CONTROL SYSTEM AND ACCESS CONTROL METHOD FOR INFORMATION INPUT APPARATUS WITH LIMITATION BY USER FOR IMAGE ACCESS AND CAMEMREMOTE CONTROL

(75) Inventors: Hiroshi Okazaki, Yokohama (JP); Hiroaki Sato, Kawasaki (JP); Tomoaki Kawai, Yokohama (JP); Takashi Oya, Yokohama (JP); Shinya Urisaka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 09/894,233

(22) Filed: Jun. 27, 2001

(65) Prior Publication Data

US 2001/0045983 A1 Nov. 29, 2001

Related U.S. Application Data

(63) Continuation of application No. 08/607,687, filed on Feb. 26, 1996, now abandoned.

(30) Foreign Application Priority Data

Feb. 27, 1995 (JP) .............................................. 7-037913
Jul. 26, 1995 (JP) .............................................. 7-190345

(51) Int. Cl.
*H04N 5/232* (2006.01)

(52) U.S. Cl. .............................. 348/211.12; 348/211.99; 348/213

(58) Field of Classification Search ............. 348/211.12, 348/207.11, 211.3, 211.8, 213, 211.99
See application file for complete search history.

(56) References Cited

U.S. PATENT DOCUMENTS 4,326,221 A   4/1982 Mallos et al. ................ 358/210
4,516,156 A * 5/1985 Fabris et al. ................ 348/14.1
4,956,769 A * 9/1990 Smith .............................. 707/9

(Continued)

FOREIGN PATENT DOCUMENTS

JP          01-209561         8/1989

(Continued)

OTHER PUBLICATIONS

Tanigawa et al., "Personal Multimedia–multipoint Teleconference System". Proceedings. Tenth Annual Joint Conference of the IEEE Computer and Communications Societies. Networking in the 90s. IEEE , Apr. 7–11, 1991 pp.: 1127–1134 vol. 3.*

(Continued)

*Primary Examiner*—Ngoc-Yen Vu
*Assistant Examiner*—Gary C. Vieaux
(74) *Attorney, Agent, or Firm*—Morgan & Finnegan, LLP

(57) ABSTRACT

When an access request (a request for transfer of video and audio information or a request for a camera operation) to a camera apparatus connected to a network via a terminal is issued via the network, a camera management server processes the access request on the basis of an access right set by a user (or a manager) using the terminal to which the camera apparatus is connected. That is, the camera management server refers to an access right set file and grants or denies permission to access for the user whose has issued the access request. The user to whom the access permission is granted requests a camera control server to permit a camera operation via a camera control client and thereby can receive an image taken by the camera apparatus and voices collected by the camera apparatus and can perform panning, tilting, and zooming of the camera apparatus. Accordingly, to protect the privacy of a user using a terminal to which a camera apparatus is connected, it is possible to realize fine setting meeting the demand of the user at all times. Also, in a location where a camera apparatus connected to a network is installed, it is possible to prevent a leak of confidential information through the camera apparatus.

34 Claims, 34 Drawing Sheets

U.S. PATENT DOCUMENTS

| | | | |
|---|---|---|---|
| 5,008,853 A | * 4/1991 | Bly et al. | 345/751 |
| 5,218,627 A | 6/1993 | Corey et al. | 348/211 |
| 5,321,740 A | 6/1994 | Gregorek et al. | 348/15 |
| 5,326,221 A | 7/1994 | Amyot et al. | 348/211 |
| 5,414,844 A | 5/1995 | Wang | 395/650 |
| 5,444,476 A | * 8/1995 | Conway | 348/14.1 |
| 5,475,421 A | 12/1995 | Palmer et al. | 348/15 |
| 5,515,491 A | * 5/1996 | Bates et al. | 345/754 |
| 5,528,289 A | * 6/1996 | Cortjens et al. | 348/211.9 |
| 5,555,376 A | 9/1996 | Theimer et al. | 713/202 |
| 5,565,910 A | 10/1996 | Rowse et al. | 348/15 |
| 5,574,901 A | * 11/1996 | Takahashi | 707/1 |
| 5,598,209 A | 1/1997 | Cortjens et al. | 348/15 |
| 5,649,105 A | * 7/1997 | Aldred et al. | 709/220 |
| 5,694,514 A | 12/1997 | Evans et al. | 386/46 |
| 5,760,917 A | 6/1998 | Sheridan | 348/211 |
| 5,959,661 A | 9/1999 | Isono | 348/14 S |

FOREIGN PATENT DOCUMENTS

| | | |
|---|---|---|
| JP | 04-232543 | 8/1992 |
| JP | 05-122690 | 5/1993 |
| JP | 05-292497 | 11/1993 |
| JP | 06112943 A * | 4/1994 |
| JP | 06133062 A * | 5/1994 |
| JP | 06181539 A * | 6/1994 |
| JP | A 7-135594 | 5/1995 |
| WO | 94/30017 | 12/1994 |

OTHER PUBLICATIONS

Gomaa, Hassan, Software Design Methods for Concurrent and Real Time Systems, Jul. 9, 1993, Chapter 3, Section 3.1.

Nance, Barry, Introduction to Networking, pp. 22, 37, 94–95, 101–13, 1993.

English Abstract of Japanese Patent Application 05–292497.

English Abstract of Japanese Patent Application 04–232543.

English Abstract and Translation of Japanese Patent Application 01–209561.

Office Action dated Mar. 25, 2005 corresponding to Japanese Patent Application No. 07–037913. No translation.

* cited by examiner

FIG. 3

```
typedef struct camera_in {
      double tilt_angle ;
      double pan_angle ;
      int zoom ;
} camera_in;

typedef struct func_out {
      int ret ;
} func_out ;

CLIENT * camera_open (char * host) ;
void camera_close (CLIENT * cl) ;

func_out * camera_pan_pos_1 (camera_in *, CLIENT * cl) ;
func_out * camera_tilt_pos_1 (camera_in *, CLIENT * cl) ;
func_out * camera_zoom_pos_1 (camera_in *, CLIENT * cl) ;
```

FIG. 4

| CAMERA NAME | USER NAME | POSITION | DIRECTION |
|---|---|---|---|
| host1 | ------------ | ( 10, 15, 20 ) | ( 20, 35 ) |
| host2 | host3 | ( 45, 32, 20 ) | ( 0, 12) |
| host3 | ------------ | | |
| host4 | host1 | | |
| ⋮ | ⋮ | | |

```
typedef struct camera_name {
        char name [MAXNAME] ;
} camera_name ;

void append_camera_list_1 (camera_name *, CLIENT * cl) ;
void delete_camera_list_1 (camera_name *, CLIENT * cl) ;
```

```
typedef struct access_in {
      char target_name [MAXNAME] ;
      char user_name [MAXNAME] ;
} access_in ;

func_out * access_begin_1 (access_in *, CLIENT * cl) ;
func_out * access_end_1 (access_in *, CLIENT * cl) ;
```

*F I G. 11*

```
typedef struct change_in {
        char target_name [MAXNAME] ;
        char user_name [MAXNAME] ;
        int access_mode ;
} change_in ;

func_out * change_access_mode_1 (change_in *, CLIENT * cl) ;
```

FIG. 12
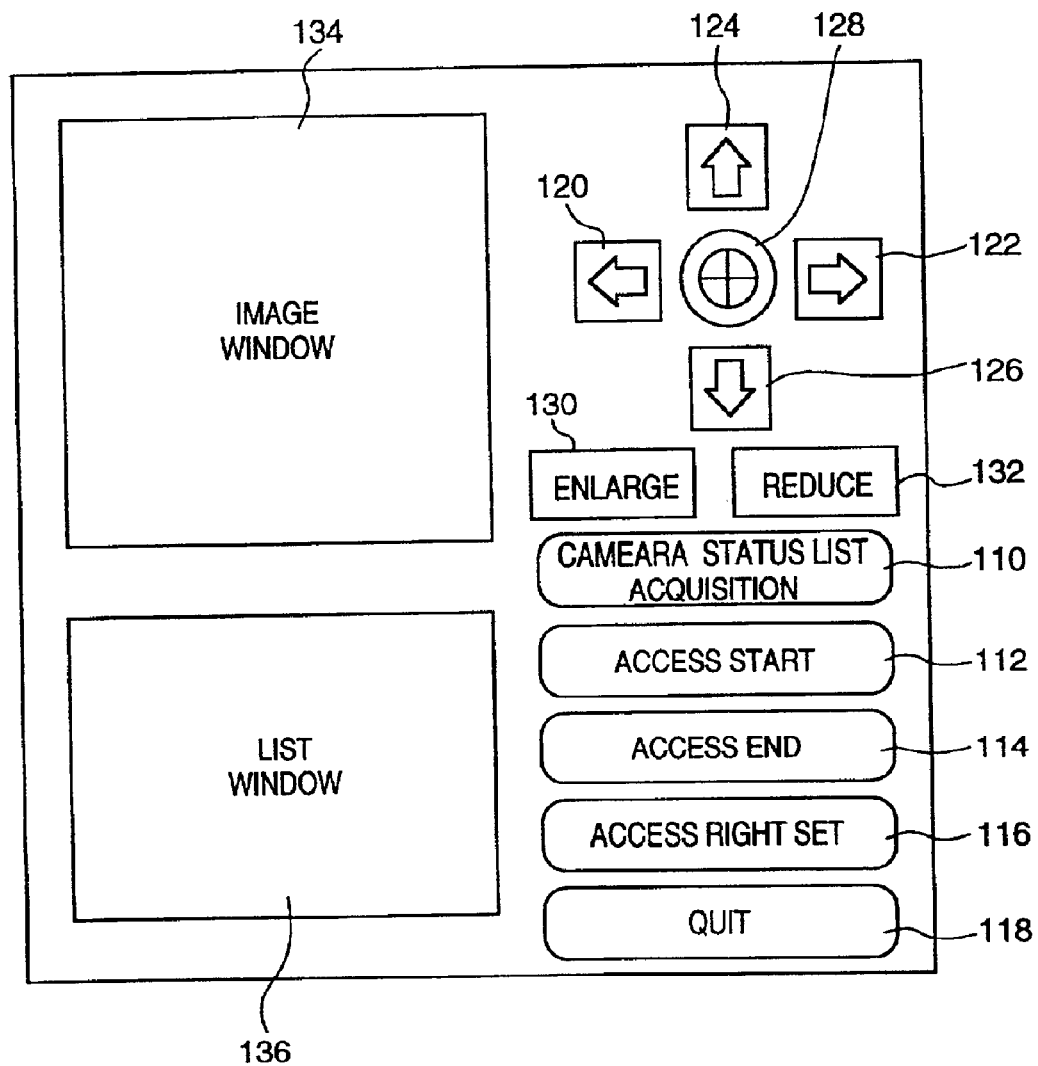
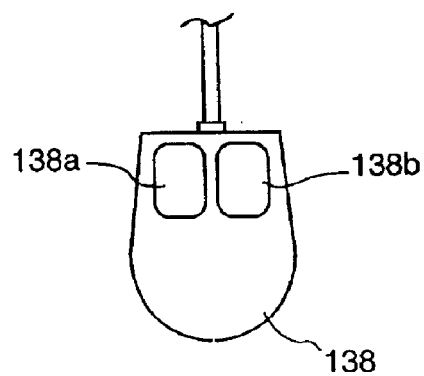

FIG. 13

| MODE MANAGEMENT TABLE | |
|---|---|
| USER NAME | MODE |
| USER 1 | 1 |
| USER 2 | 2 |
| USER 3 | 1 |
| ⋮ | ⋮ |

FIG. 14

| LIMITING RANGE MANAGEMENT TABLE | | | |
|---|---|---|---|
| MODE | OPERATION | UPPER LIMIT | LOWER LIMIT |
| 3 | PAN | 5.0° | (−5.0)° |
| 3 | TILT | 7.0° | (−7.0)° |
| 3 | ZOOM | 60 mm | 70 mm |

```
typedef struct limitation {
    char camera_name [MAXNAME];
    char user_name [MAXNAME];
    int limit_mode;
    double tilte_plus_angle;
    double tilte_minus_angle;
    double pan_plus_angle;
    double pan_minus_angle;
    int min_zoom;
    int max_zoom;
} limitation;

void set_limit_mode_1 (limitation *, CLIENT * cl);
```

FIG. 23

| CAMERA NAME | HOST NAME | PAN, TILT, AND ZOOM | OWNER | USE STATE | REMARKS |
|---|---|---|---|---|---|
| CAMERA 1 | HOST 1 | (50, 10, 30) | USER 1 | USER 3 | ........ |
| CAMERA 2 | HOST 1 | (20, 25, 0) | USER 1 | UNUSED | ........ |
| CAMERA 3 | HOST 2 | (-10, -5, 0) | USER 2 | UNUSED | ........ |
| CAMERA 4 | HOST 3 | (30, 0, 15) | USER 4 | USER 1 | ........ |
| CAMERA 5 | HOST 3 | (-15, 15, 50) | USER 3 | UNUSED | ........ |
| ........ | ........ | ........ | ........ | ........ | ........ |

F I G. 24

| USER NAME | VOICE RECEPTION | IMAGE RECEPTION | CAMERA OPERATION |
|---|---|---|---|
| USER 1 | PERMITTED | PERMITTED | PERMITTED |
| USER 2 | PERMITTED | PERMITTED | PARTIALLY PERMITTED |
| USER 3 | PERMITTED | PERMITTED | PERMITTED |
| USER 4 | PERMITTED | PERMITTED | INHIBITED |
| USER 5 | INHIBITED | PERMITTED | INHIBITED |
| USER 6 | PERMITTED | PERMITTED | INHIBITED |
| USER 7 | INHIBITED | PERMITTED | INHIBITED |
| USER 8 | PERMITTED | PERMITTED | PERMITTED |
| ⋮ | ⋮ | ⋮ | ⋮ |
| USER n | INHIBITED | INHIBITED | INHIBITED |

FIG. 25A

| USER GROUP NAME | GROUP MEMBERS |
|---|---|
| GROUP 1 | USER 1  USER 3  USER 8 |
| GROUP 2 | USER 2 |
| GROUP 3 | USER 4  USER 6 |
| GROUP 4 | USER 5  USER 7 |
| ⋮ | ⋮ |
| GROUP m | USER n |

FIG. 25B

| USER GROUP NAME | VOICE RECEPTION | IMAGE RECEPTION | CAMERA OPERATION |
|---|---|---|---|
| GROUP 1 | PERMITTED | PERMITTED | PERMITTED |
| GROUP 2 | PERMITTED | PERMITTED | PARTIALLY PERMITTED |
| GROUP 3 | PERMITTED | PERMITTED | INHIBITED |
| GROUP 4 | INHIBITED | PERMITTED | INHIBITED |
| ⋮ | ⋮ | ⋮ | ⋮ |
| GROUP m | INHIBITED | INHIBITED | INHIBITED |

FIG. 26A

| USER GROUP NAME | VOICE RECEPTION | IMAGE RECEPTION | CAMERA OPERATION |
|---|---|---|---|
| GROUP 1 | PERMITTED | PERMITTED | PERMITTED |
| GROUP 2 | PERMITTED | PERMITTED | PERMITTED |
| OTHERS | PERMITTED | PERMITTED | INHIBETED |

FIG. 26B

| USER GROUP NAME | VOICE RECEPTION | IMAGE RECEPTION | CAMERA OPERATION |
|---|---|---|---|
| GROUP 1 | PERMITTED | PERMITTED | PERMITTED |
| GROUP 2 | PERMITTED | PERMITTED | INHIBITED |
| OTHERS | INHIBITED | INHIBITED | INHIBITED |

FIG. 26C

| USER GROUP NAME | VOICE RECEPTION | IMAGE RECEPTION | CAMERA OPERATION |
|---|---|---|---|
| GROUP 1 | INHIBITED | PERMITTED | INHIBITED |
| GROUP 2 | INHIBITED | INHIBITED | INHIBITED |
| OTHERS | INHIBITED | INHIBITED | INHIBITED |

FIG. 32

```
┌─────────────────────────────────────┐
│        ACCESS CONTROL PANEL         │
├─────────────────────────────────────┤
│                                     │
│  CAMERA NAME                        │
│  ┌───────────────────────────────┐  │
│  │   CAMERA 1                    │  │
│  │   CAMERA 2                    │  │
│  │   CAMERA 4                    │  │
│  └───────────────────────────────┘  │
│                                     │
│     ○  PUBLIC                       │
│                                     │
│     ◉  PRIVATE                      │
│                                     │
│   ACCESS MODE      │  NORMAL  │     │
│                                     │
│  │       SET ACCESS RIGHT       │   │
│                                     │
│  │    CANCEL   │   │     OK    │    │
└─────────────────────────────────────┘
```

FIG. 33

CAMERA INFORMATION

| | |
|---|---|
| CAMERA NAME | CAMERA 1 |
| HOST NAME | HOST 1 |
| CAMERA OWNER | URISAKA |
| LOG-IN USER | URISAKA |
| INSTALLER | KAWAI |

[ DELETE CAMERA ]   [ CLOSE ]

FIG. 34

ACCESS MODE
- OPEN
- NORMAL
- CLOSE

FIG. 35

ACCESS RIGHT SET

CAMERA OWNER: URISAKA

ACCESS MODE: NORMAL

| USER GROUP NAME | VOICE RECEPTION | IMAGE RECEPTION | CAMERA OPERATION |
|---|---|---|---|
| GROUP 1 | PERMITTED | PERMITTED | PERMITTED |
| GROUP 2 | PERMITTED | PERMITTED | INHIBITED |
| OTHERS | INHIBITED | PERMITTED | INHIBITED |

— ACCESS RIGHT DISPLAY CHANGE PORTION

[CANCEL]  [DEFAULT]  [OK]

F I G. 36
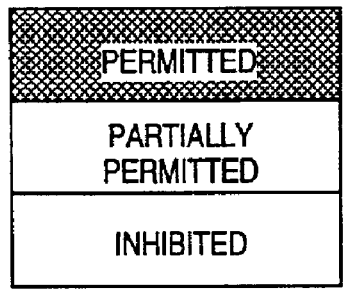
F I G. 37
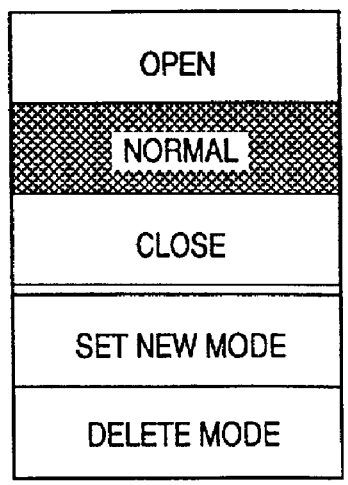

F I G. 38
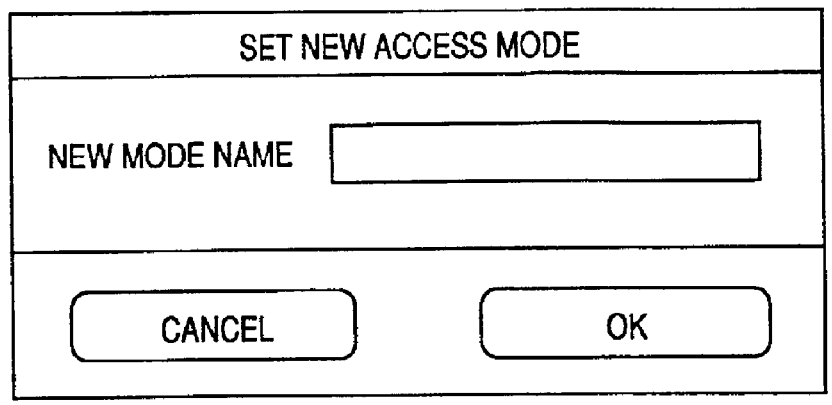
F I G. 39
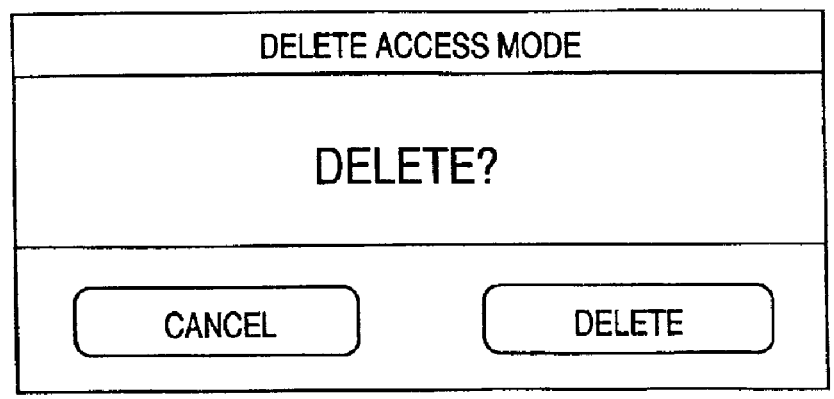

REMOTE CONTROL SYSTEM AND ACCESS CONTROL METHOD FOR INFORMATION INPUT APPARATUS WITH LIMITATION BY USER FOR IMAGE ACCESS AND CAMEMREMOTE CONTROL

This is a continuation of prior application Ser. No. 08/607,687, filed Feb. 26, 1996 now abandoned, to which priority under 35 U.S.C. §120 is claimed.

BACKGROUND OF THE INVENTION

1. Field of the Invention

The present invention relates to a remote control system and an access control method for an information input apparatus and, more particularly, to a remote control system and a remote control method of remotely operating a camera apparatus equipped with a video camera and a microphone for a TV conference, and an access control method of controlling access to a camera apparatus connected to a network.

2. Description of the Related Art

As a monitoring system or a communication conference system, a network system has been proposed in which computers connected to video cameras are connected in a network to allow an operator to remotely operate a video camera connected to another arbitrary computer and to receive an image from a given video camera. In this video transmission system, a given computer can remotely operate a given video camera and receive an image taken by the video camera. When microphones are also installed together with video cameras, it is possible to simultaneously receive an image taken by a given video camera and voices collected by a microphone attached to the video camera.

The above remote monitoring system and TV conference system use cameras whose panning, tilting, and zooming are remotely controllable. However, the TV conference system is a dedicated system installed in a conference room, and so terminals capable of participating in the conference are usually limited. That is, it is not expected that a terminal which is not a conference member newly participates in the conference while the conference is being held. Accordingly, all terminals need to become conference members in advance, and a system manager performs a setting operation for that purpose.

Recently, however, high-speed computer networks have rapidly become popular and improvements in the function and reduction in the cost of workstations or personal computers have advanced. As a result, it has become possible to realize a TV conference system in which many unspecified persons can participate by using personal computers and the like apparatuses.

In such a TV conference system in which unspecified persons are expected to participate, a large number of persons take part in and leave the TV conference as needed, and consequently system management becomes more and more important. The system management is to control participation in and retirement from the conference (connection and disconnection of a terminal with respect to the network), set access permissions between terminals of conference participants, and inform access states between the conference participants.

It is particularly necessary to be able to dynamically manage granting and withholding of permission to perform a camera operation. The following consideration also is necessary for terminals except for dedicated terminals installed in a conference room. That is, general computers are arranged in accordance with their respective principal purposes. Therefore, if a video camera for a TV conference is arranged in the vicinity of such a computer, an image which the user does not want another person to see is transmitted to other terminals as, e.g., a background. It is unnatural and troublesome to draw a curtain in the background only for a TV conference. A video camera of the self-terminal can be made unable to be controlled by other terminals. However, this makes smooth conversions difficult and impairs the advantage that images of persons and materials can be taken and transmitted in proper sizes at proper locations any time.

SUMMARY OF THE INVENTION

It is an object of the present invention to provide an access control system and an access control method which solve the above conventional problems and are used for an information input apparatus, particularly a camera apparatus, connected to a computer network. That is, it is an object of the present invention to allow a camera owner to freely set an acquisition right to an image (and voices) obtained by a video camera (and a microphone) which he or she owns and a remote operation right to the video camera.

To achieve the above object, one preferred embodiment of the present invention discloses an access control method of controlling access to an information input apparatus connected to a network via a terminal, comprising:

the registration enter/delete step of entering or deleting registration of said information input apparatus in or from management information for managing access to said information input apparatus via said network;

the set step of setting, in the management information, a right to access, via said network, said information input apparatus registered in the management information; and the management step of managing access to said information input apparatus via said network on the basis of the management information.

It is another object of the present invention to provide a remote control system and a remote control method capable of dynamically managing granting and withholding of permission to perform a camera operation of a camera apparatus connected to a computer network, thereby allowing a large number of users to remotely operate, where necessary, camera apparatuses connected to the network without stopping the system and easily take part in or leave the TV conference.

To achieve the above object, one preferred embodiment of the present invention discloses a camera apparatus remote control system comprising:

a camera apparatus capable of being remotely operated via a network; and managing means for managing access to said camera apparatus via said network on the basis of stored management information.

It is still another object of the present invention to provide a plurality of stages of access limiting modes in a remote operation of camera apparatuses connected to a computer network and thereby allow each user to set an appropriate imaging or photographing enable range including operation inhibition.

To achieve the above object, one preferred embodiment of the present invention discloses a camera apparatus remote control system comprising:

a camera apparatus capable of being remotely operated via a network; and managing means for managing access to said camera apparatus via said network on the basis of stored management information, wherein the management information contains limitation information for limiting an operation of said camera apparatus for each user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view for explaining a function of calling a camera control server in FIG. 2;

FIG. 4 is a view showing an example of a camera status list;

FIG. 5 is a view for explaining a function of entering and deleting registration of a camera apparatus;

FIG. 11 is a view for explaining a function of setting an access right;

FIG. 12 is a view showing an example of a camera control panel;

FIG. 13 is a view showing an example of a management list for managing an access limiting mode for each user;

FIG. 14 is a view showing an example of a management table for managing a limiting range in a restricted permission mode;

FIG. 23 is a view showing an example of the structure and contents of a camera list;

FIG. 24 is a view showing an example of an access right set table;

FIGS. 25A and 25B are views showing examples of access right setting in which user groups are taken into account;

FIGS. 26A to 26C are views showing examples of setting of an access mode;

FIG. 32 is a view showing an example of an access control panel;

FIG. 33 is a view showing an example of a camera information panel;

FIG. 34 is a view showing a pop-up list for selecting an access mode;

FIG. 35 is a view showing an example of an access right set panel;

FIG. 36 is a view showing a pop-up list for changing an access right;

FIG. 37 is a view showing a pop-up list for selecting, adding, and deleting an access mode;

FIG. 38 is a view showing a new access mode set dialogue panel;

FIG. 39 is a view showing an access mode delete dialogue panel;

DETAILED DESCRIPTION OF THE PREFERRED EMBODIMENTS

Embodiments of the present invention will be described in detail with reference to the accompanying drawings.

First Embodiment

[Hardware Configuration]

Figure 1:
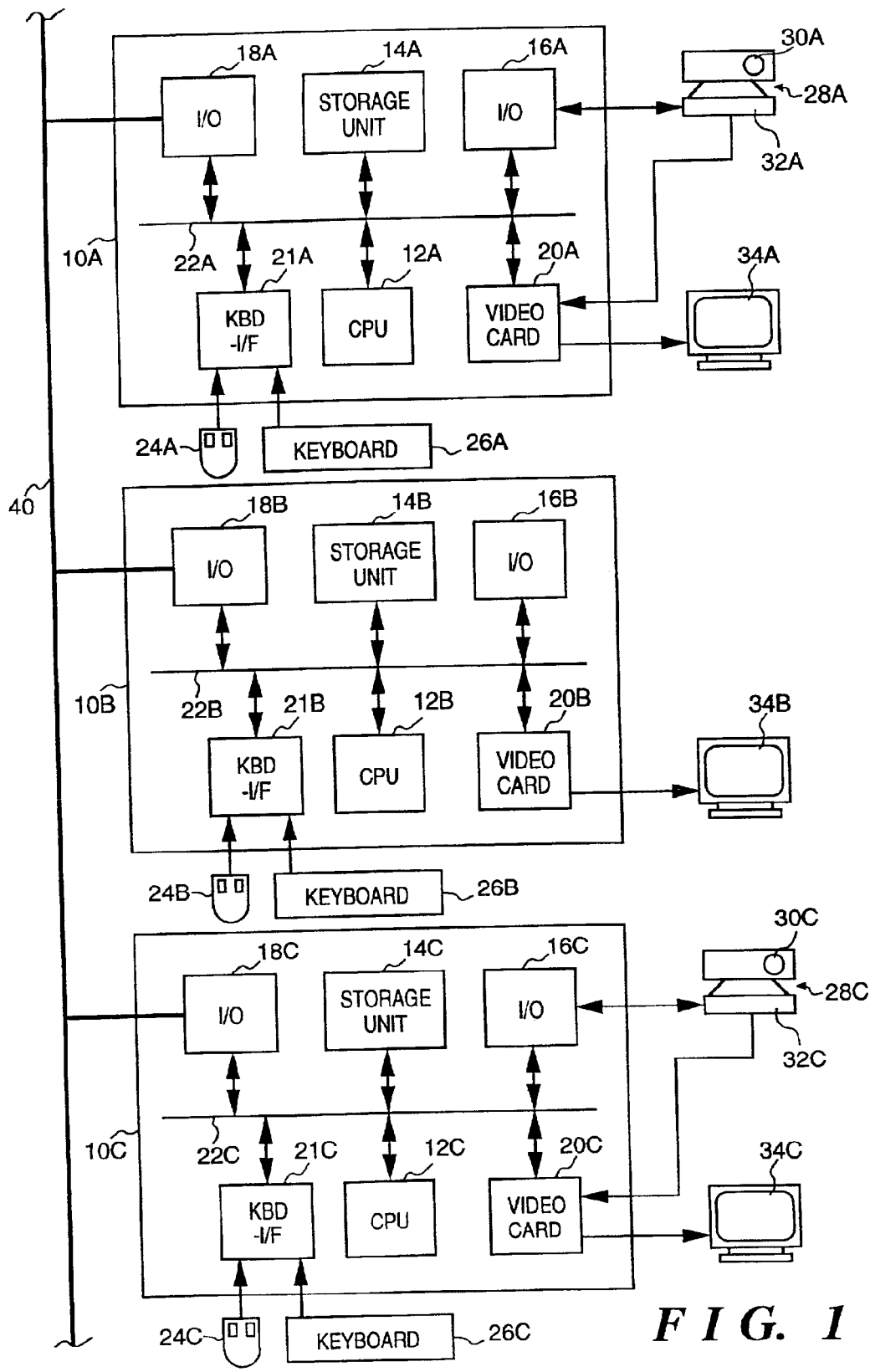
FIG. 1 is a schematic block diagram showing the configuration of hardware of the first embodiment according to the present invention.

FIG. 1 is a block diagram showing an outline of the configuration of the first embodiment of the present invention. In the embodiment shown in FIG. 1, three workstations 10A, 10B, and 10C are connected to a network 40. These workstations 10A, 10B, and 10C include CPUs 12A, 12B, and 12C, storage units 14A, 14B, and 14C each having a ROM, a RAM, and a hard disk drive (external storage device), I/O ports 16A, 16B, and 16C, and 18A, 18B, and 18C, as input/output units, and video cards 20A, 20B, and 20C, all of which are connected to buses 22A, 22B, and 22C, respectively. Mouses 24A, 24B, and 24C, as pointing devices, and keyboards 26A, 26B, and 26C are also connected to the buses 22A, 22B, and 22C via keyboard interfaces (KBD-I/F) 21A, 21B, and 21C, respectively.

Camera apparatuses 28A and 28C whose panning, tilting, and zooming can be externally controlled are connected to the workstations 10A and 10C via the I/O ports 16A and 16C, respectively. These camera apparatuses 28A and 28C include cameras 30A and 30C having zoom lenses and panheads 32A and 32C for panning and tilting the cameras 30A and 30C, respectively.

Monitor displays (to be abbreviated as monitors hereinafter) 34A, 34B, and 34C are connected to the video cards 20A, 20B, and 20C of the workstations 10A, 10B, and 10C, respectively. The video cards 20A and 20C display images from the camera apparatus 28A and 28C and/or images received from the network 40 on the monitors 34A and 34C, respectively. The video card 20B displays images received from the network 40 on the monitor 34B. The monitors 34A, 34B, and 34C can, of course, display other information including a camera control panel (to be described later).

Since no camera apparatus like the camera apparatuses 28A and 28C is connected to the workstation 10B, the workstation 10B cannot transmit a nearby image to the workstations 10A and 10C.

The CPUs 12A, 12B, and 12C control their respective workstations 10A, 10B, and 10C and communications done via the network 40. The control programs of these CPUs 12A, 12B, and 12C are stored in the ROMs or the hard disk drives of the storage units 14A, 14B, and 14C, respectively. The RAM of each storage unit stores various data and is also used as a work memory by the corresponding CPU. The I/O ports 16A and 16C transfer camera control signals from the CPUs 12A, 12B, and 12C to the camera apparatuses 28A and 28C and transfer camera status signals from the camera apparatuses 28A and 28C to the CPUs 12A and 12C. The data transfer between the I/O ports 16A and 16C and the camera apparatuses 28A and 28C is done via a versatile interface (e.g., RS232C).

The workstations 10A, 10B, and 10C connect to the network 40 via the I/O ports 18A, 18B, and 18C, respectively.

A TV conference can be performed by using the basic hardware configuration as above. In this embodiment, workstations are used by taking account of their versatility and performance. However, it is evident that the above system can also be realized by using personal computers when recent improvements in the performance of such computers are taken into account. It is also possible to use dedicated controllers instead of workstations.

[Software Configuration]

Figure 2:
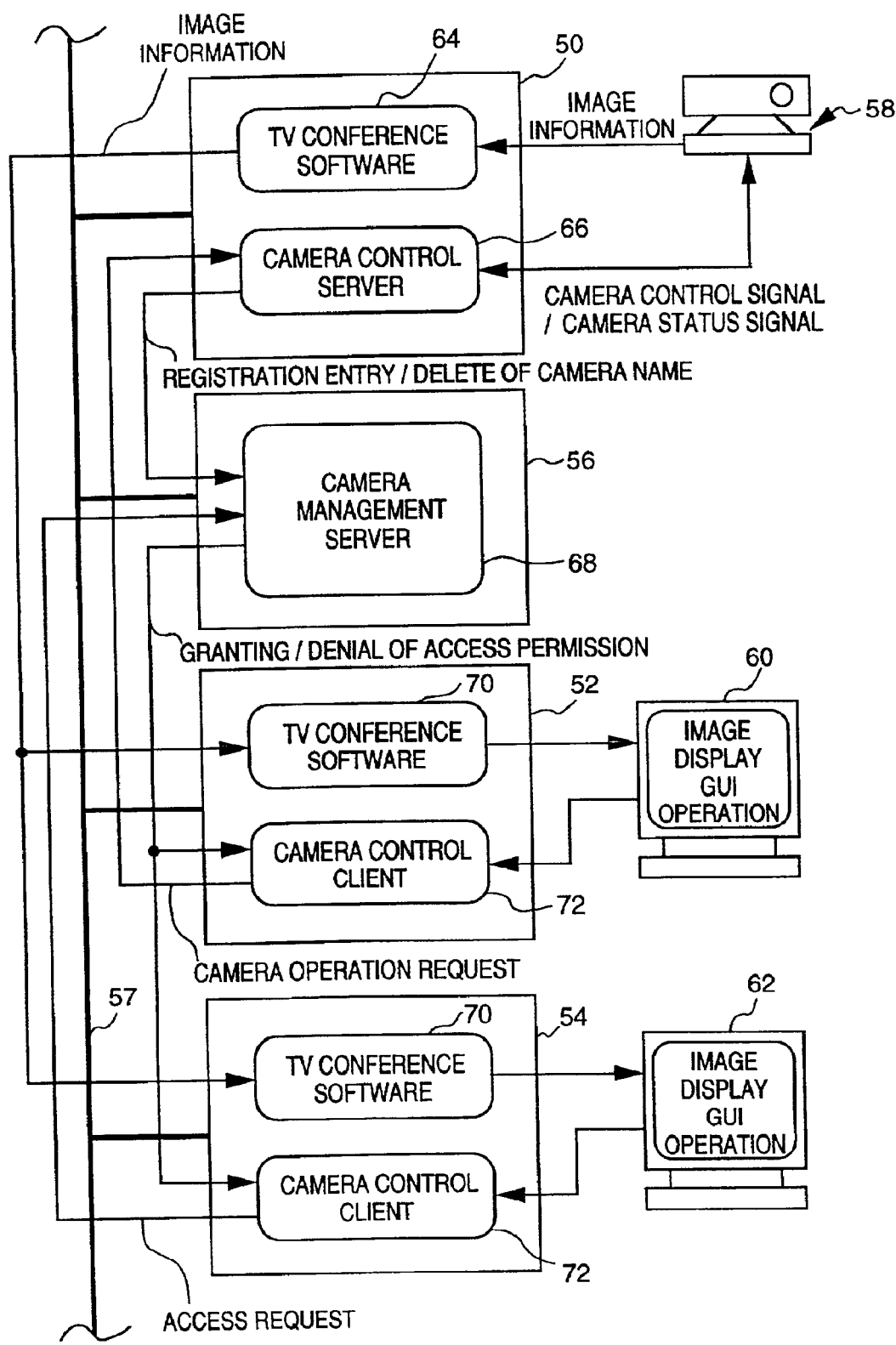
FIG. 2 is a block diagram showing an outline of the configuration of software for executing the embodiment.

FIG. 2 shows a software configuration for executing this embodiment. FIG. 2 separately illustrates software (server) installed in a terminal to which a camera apparatus is directly connected and software (client) installed in a terminal from which the camera apparatus is remotely operated. In a normal use form, however, both the software are naturally installed in each individual terminal.

Referring to FIG. 2, workstations 50, 52, 54, and 56 are connected to a network 57, a camera apparatus 58 equivalent to the camera apparatus 28A or 28C is connected to the workstation 50, and monitors 60 and 62 are connected to the workstations 52 and 54, respectively. As will be described later in detail, the workstations 56 manages access to camera apparatuses usable in a TV conference.

TV conference software 64 and a camera control server (software) 66 are installed in the workstation 50. The TV conference software 64 transmits image information obtained by the camera apparatus 58 to other workstations via the network 57. The camera control server 66 controls the camera apparatus 58 in accordance with camera operation requests from the workstations 52 and 54.

A camera management server (software) 68 is installed in the workstation 56. When the camera apparatus 58 is activated, the camera control server 66 request the camera management server 68 to register the information that the camera apparatus 58 is connected to the TV conference system (network 57), i.e., the camera apparatus 58 is actually usable. The camera management server 68 stores this information.

TV conference software 70 and a camera control client 72 are installed in each of the workstations 52 and 54. The TV conference software 70 displays an image from the workstation 50 on the monitor 60 or 62. The camera control client 72 displays a camera control panel (to be described in detail later) for remotely controlling a camera apparatus (in this case the camera apparatus 58) and processes the operation on the camera control panel. As will be described later in detail, the users of the workstations 52 and 54 can refer to, register, and update various information managed by the camera management server 68 by using the camera control client 72. When the camera management server 68 permits connection (including reception of an input image and remote control) to a camera apparatus (in this case the camera apparatus 58) of another workstation, the camera control client 72 can transmit a camera operation request to the camera control server 66 without passing the request through the camera management server 68.

In FIG. 2, the camera management server 68 is installed in a dedicated workstation. However, it is of course possible to install the camera management server 68 in any of the workstations (the workstations 50, 52, and 54 in FIG. 2) participating in the TV conference network 57. Alternatively, the camera management server 68 is previously installed in all terminals scheduled to take part in the TV conference. If this is the case it is only necessary to activate the camera management server 68 in one of two terminals starting the TV conference.

In a normal use both of a monitor and a camera apparatus are usually connected to each workstation. Therefore, the TV conference software consists of a single program or a group of program modules for the TV conference. Generally, other software also consists of a single program or a group of program modules. The workstations 10A and 10C in FIG. 1 consist of the workstations 50 and 52 (or 54) in FIG. 2, and the workstation 10B consists of the workstations 52 or 54. The workstation 56 in FIG. 2 is one of the workstations 10A, 10B, and 10C in FIG. 1.

[Camera Control]

Camera control in the configuration shown in FIG. 2 will be described below.

A procedure of allowing the workstation 52 or 54 to remote-control the camera apparatus 58 connected to the workstation 50 will be described first. The camera control server 66 of the workstation 50 can control the camera apparatus 58 by transmitting a camera control signal to the camera apparatus 58. In this embodiment, the workstations 52 and 54 can remotely activate camera control functions (functions pertaining to camera control such as panning, tilting, and zooming) contained in the camera control server 66 of the workstation 50 by using RPC (Remote Procedure Call). With this RPC the workstations 52 and 54 can indirectly, remotely control the camera apparatus 58. A called camera control function outputs command strings with the corresponding contents to the camera apparatus 58. Of these command strings, a command string pertaining to the operation, such as panning and tilting, of the panhead is transmitted to the controller of the panhead, and a command string pertaining to the operation, such as zooming, of the camera is transmitted to the controller of the camera.

In this embodiment, a function as illustrated in FIG. 3 is prepared as a function of calling the camera control server 66 in a distant place from the camera control client 72 by using RPC. In the following description, functions and commands shown in the accompanying drawings are sometimes bracketed in []. In this specification, each function is described in C language. However, this expression naturally changes if a different program language is used.

In FIG. 3, [struct camera_in { . . . } camera_in] is a data declaration for setting a parameter set transferred from the camera control client 72 to the camera control server 66 in order to control the camera apparatus 58. In this embodiment it is possible to set parameters tilt (tilt_angle), pan (pan_angle), and zoom (zoom).

[struct func_out { . . . } func_out] is a data declaration for setting an output value of the function. For example, when there is no problem in the processing result of the function such as in a normal case, "0" is returned. If there is a problem, a value of "1" or larger is returned in accordance with the problem.

camera_open is a function of forming a client handler [CLIENT*cl] necessary to communicate with the camera control server 66. camera_close is a function of erasing the client handler. The client handler [CLIENT*cl] specifies a camera apparatus to be controlled.

[User Management]

User management by the camera management server 68 will be described below. The camera management server 68 manages a camera apparatus and the user of the apparatus by using a camera status list 80 with the structure as shown in FIG. 4. The camera status list 80 stores a name indicating, e.g., the camera apparatus 58 connected to the network 57, the use state (e.g., the camera is not being used or is being accessed by another user) of the camera, the installation position (x,y,z) of the camera, and the direction (the pan angle and the tilt angle) of the camera. If the camera control server (e.g., 66) controls only one camera apparatus (e.g., 58), the user name or the host name of the workstation in which the camera control server is operating can be used as the name of the camera apparatus. However, it a single camera control server controls two or more camera apparatuses, the individual camera apparatuses are given different names so as to be distinguished from each other. In the following description and drawings, the name for specifying a camera apparatus will be referred to as a camera name.

Four camera apparatuses are illustrated in the camera status list 80 in FIG. 4, and they are given names host1, host2, host3, and host4. This camera status list 80 shows the state in which the user of host3 is operating the camera apparatus of host2 and the user of host1 is operating the camera apparatus of host4. The camera apparatuses host1 and host 3 are not being operated by any user.

Processing of entering and withholding registration of a camera apparatus will be described below. When activated, the camera control server 66 informs the camera management server 68 of the name (camera name) of the activated camera apparatus and causes the camera management server 68 to register the camera name in the camera status list 80. When stopped, the camera control server 66 causes the camera management server 68 to delete the corresponding camera name from the camera status list 80. These operations are realized by RPC by using functions illustrated in FIG. 5. In FIG. 5, [struct camera_name { . . . } camera_name] is a data declaration for setting a camera name, and MAXNAME defines the maximum number of characters of the camera name to be set. append_camera_list_1 and delete_camera_list_1 are functions called when the camera control server 66 is started and stopped, respectively, to update the camera status list 80 in the camera management server 68.

Figure 6:
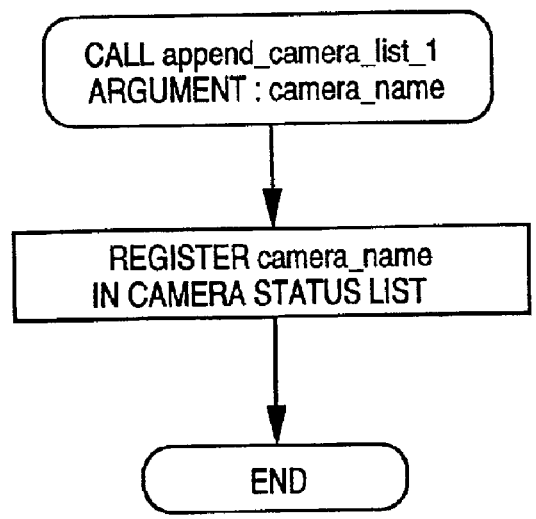
FIG. 6 is a flow chart showing processing of registering a camera apparatus.

When started, the camera control server 66 calls the function append_camera_list_1 by using the camera name designating the camera apparatus as an argument. Consequently, as shown in FIG. 6, the camera management server 68 registers the camera name (camera_name) of the camera apparatus which is made usable in the camera status list 80. As in FIG. 5, the camera name is held by "name" as an element of a structure camera_name which represents a parameter defined by [struct camera_name { . . .} camera_name]. After this processing, the camera apparatus (58 in FIG. 2) specified by the registered camera name can be operated from another workstation via the camera control server (66 in FIG. 2) which controls the camera apparatus.

Figure 7:
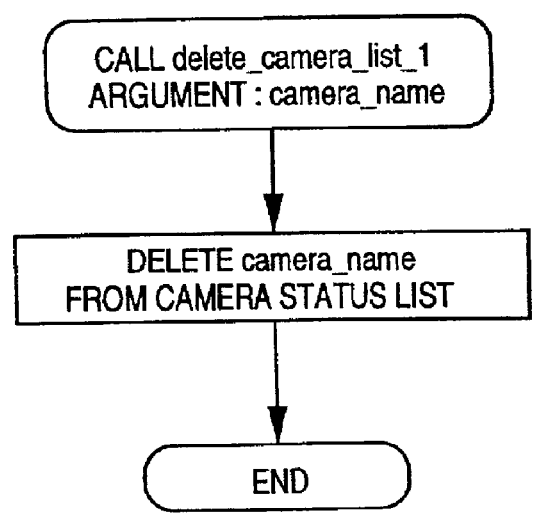
FIG. 7 is a flow chart showing processing of entering and deleting registration of a camera apparatus.

When stopped, the camera control server 66 calls the function delete_host_list_1 by using the camera name designating the camera apparatus as an argument. Consequently, as illustrated in FIG. 7, the camera management server 68 deletes the camera name of the camera apparatus which is no longer usable after that from the camera status list 80.

[Access Management]

In the following description, an object which operates a camera apparatus or requests an operation of a camera apparatus is called a user, and the user is specified by a user name. However, an object which operates a camera apparatus or requests an operation of a camera apparatus can also be represented by a workstation (host). If this is the case, the host is specified by a host name.

Figures 8, 9:
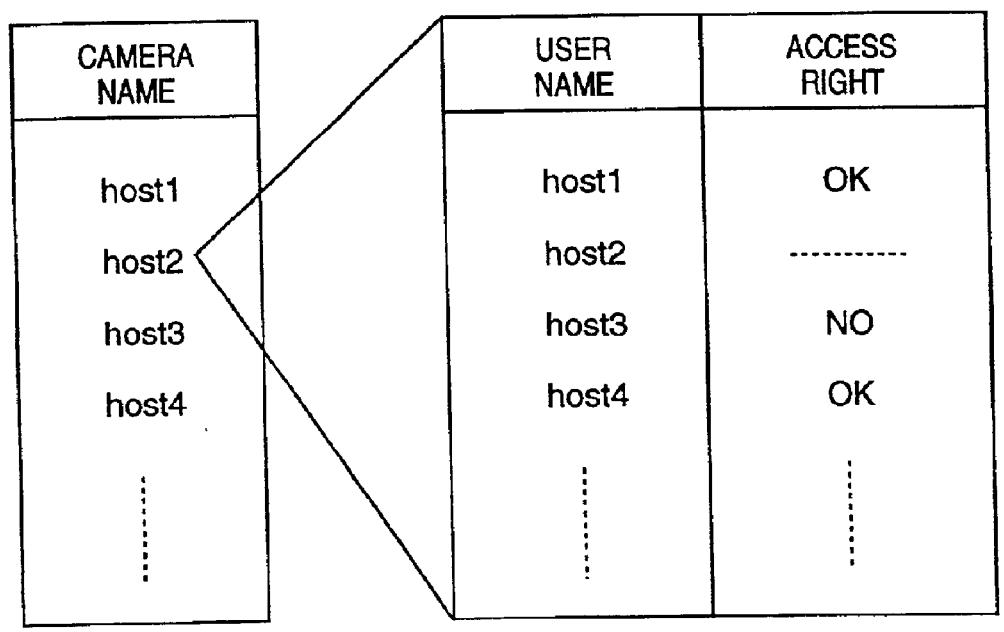
FIG. 8 is a view for explaining a function of starting and ending access.
FIG. 9 is a view showing an example of an access permission list.

Access management by the camera management server 68 will be described below. To realize access management by the camera management server 68, access_begin_1 and access_end_1 shown in FIG. 8 are provided as functions of calling the camera management server 68 from the camera control client 72 by using RPC. The function access_being_1 executes access begin processing (access request), and the function access_end_1 executes access end processing. [struct access_in { . . .} access_in] is a parameter string declaration of an access object and transferred from the camera control client 72 to the camera management server 68. A parameter target_name specifies an object (camera name) to be accessed, and a parameter user_name specifies a user name.

The camera management server 68 includes an access permission list 82 shown in FIG. 9. The access permission list 82 stores the presence/absence of the access (i.e., remote operation and image reception) right of a user who is participating in or may participate in the TV conference for each camera apparatus (camera name) previously registered in the camera status list 80. In FIG. 9, the users indicated by host1 and host2 are permitted to access the camera apparatus indicated by host2, and access by the user indicated by host3 is inhibited. Note that the user of host2 is not an object of this access permission list 82 because this user can directly control the camera apparatus indicated by host2 without using the camera management server 68.

Figure 10:
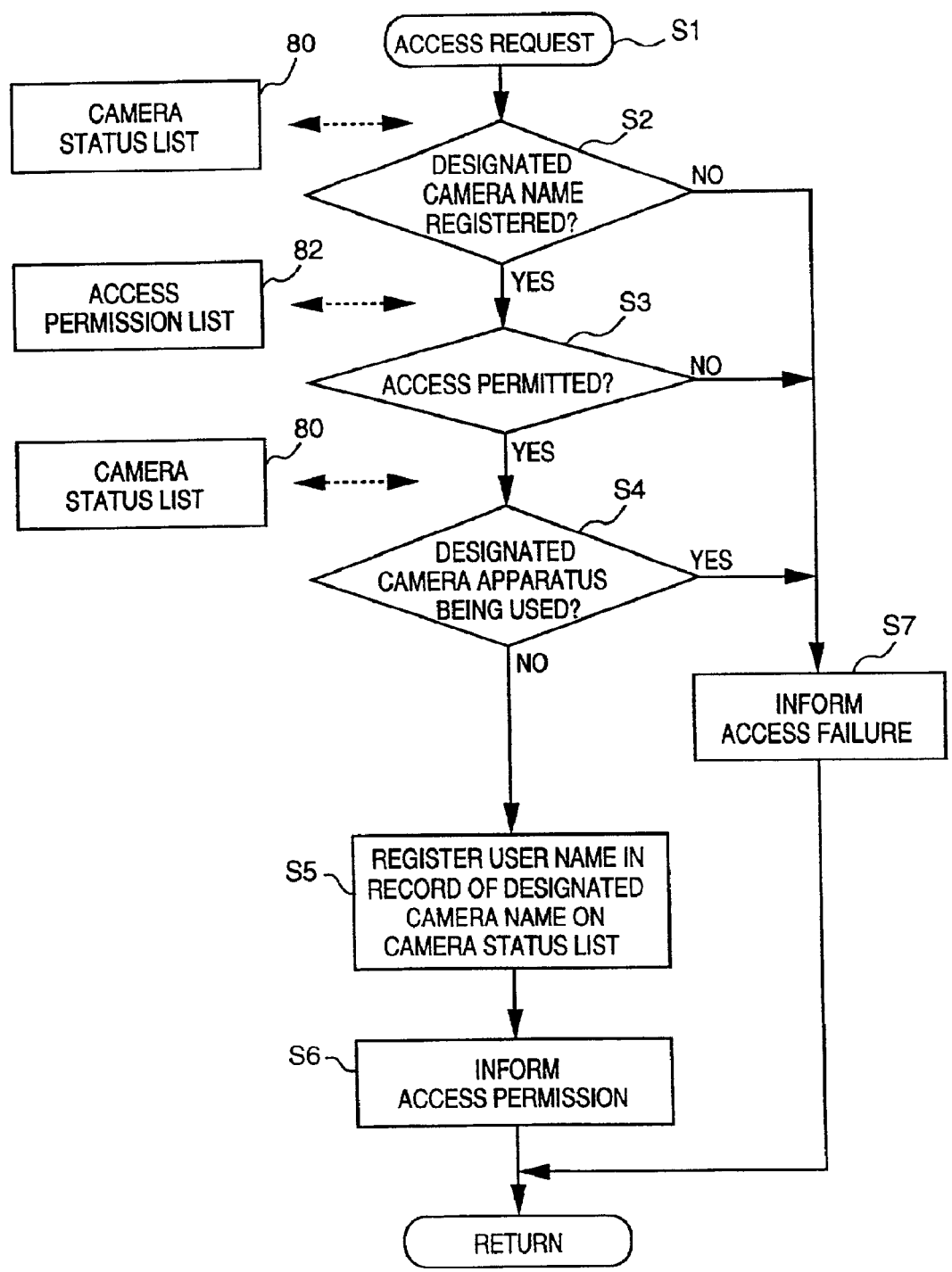
FIG. 10 is a flow chart showing processing for an access request.

An access request from the camera control client 72 is processed by the camera management server 68 in accordance with the flow chart shown in FIG. 10. When a given camera control client 72 intends to use (receive an image from and operate) a given camera apparatus (in this case the camera apparatus 58), this camera control client 72 transmits an access request specifying the camera name of the object to the camera management server 68. The camera management server 68 first decodes the camera name specified by the access request by using the parameter target_name (S1).

The camera management server 68 then refers to the camera status list 80 to check whether the specified camera apparatus is registered (S2). If the camera apparatus is not registered, the camera management server 68 informs the request source that the specified camera apparatus is not registered (S7).

If the specified camera apparatus is registered (S2), the camera management server 68 decodes the parameter user_name and checks by referring to the access permission list 82 whether the user designated by the parameter has an access right to the designated camera apparatus (S3). If the user does not have access permission, the camera management server 68 informs the request source that the user does not have permission (S7).

If the user has access permission (S3), the camera management server 68 checks by referring to the camera status list 80 whether the designated camera apparatus is being used by another user (S4). If the designated camera apparatus is being used, the camera management server 68 informs the request source that the camera apparatus is being used by another user (S7).

If the designated camera apparatus is not being used by any user (S4), the camera management server 68 registers the user name in the record of the designated camera name of the camera status list 80 (S5) and informs the request source of access permission (S6).

Note that the camera control client 72 necessarily calls the functions access_begin_1 and access_end_1 before and after a camera operation.

In this embodiment, each user (or a specific permitted user) can change the contents relating to the user in the access permission list 82. For this purpose a function change_access_mode_1 in FIG. 11 is provided.

The camera control client 72 sets a camera name (camera apparatus) whose access permission is to be changed in the parameter target_name with a structure defined by [struct change_in {. . . } change_in], sets a user name as an object of access permission in the parameter user_name, and also an the access right after the change in a parameter access_mode. The camera control client 72 then calls the function change_access_mode_1. The camera management server 68 changes the access right of the user indicated by the parameter user_name to the mode indicated by the parameter access_mode. The parameter access_mode includes access permission and access inhibition. In the case of access permission, data corresponding to [OK] is recorded on the access permission list 82 as shown in FIG. 9. In the case of access inhibition, data corresponding to [NO] is recorded.

To facilitate the above various operations, the camera control client 72 displays a camera control panel as illustrated in FIG. 12 on the monitor screen and thereby achieves a GUI (Graphical User Interface) operation. The users of the workstations 52 and 54 can obtain information concerning the registration, use, and use permission states of the camera apparatuses participating in the TV conference and can also switch camera apparatuses to be operated. These users also can change the access right to a camera apparatus.

[Camera Control Panel]

An operation method using the camera control panel shown in FIG. 12 will be described below. By using RPC, this camera control panel activates a function corresponding to the function assigned to each button in accordance with a button operation by the user. That is, when the user depresses a camera status list acquisition button 110, he or she can obtain current access information of each camera apparatus from the camera management server 68 in the manner as described above. As is well known, the user can operate a given one of buttons 110 to 132 by operating a mouse 138 (corresponding to the mouses 24A, 24B, and 24C in FIG. 1) to move and position the cursor onto a desired button on the monitor screen and clicks a first button 138a. The information obtained from the camera management server 68 is displayed in a list window 136. Accordingly, the camera status list 80 attained from the camera management server 68 also is displayed in the list window 136. From the camera status list 80 displayed in the list window 136, therefore, the user can select a camera apparatus which he or she intends to control by using the mouse 138 or a keyboard (corresponding to the keyboards 26A, 26B, and 26C in FIG. 1).

The access request processing and the access end processing described previously are assigned to an access start button 112 and an access end button 114, respectively. The access right change processing is assigned to an access right set button 116. When the user pushes the access right set button 116, a portion of the access permission list 80 relating to the user is displayed in the list window 136, and the user can change the contents of that portion on the list by using the mouse 138 or the keyboard. The user pushes an application quit button 118 when he or she wishes to quit all operations.

An large taken by the designated camera apparatus is displayed in an image window 134 on the monitor screen. The user can perform panning, tilting, and zooming of the camera apparatus by operating pan operation buttons 120 and 122, tilt operation buttons 124 and 126, a home position return button 128, a zoom (enlarge) operation button 130, and a zoom (reduce) operation button 132. In accordance with these operations, the camera apparatus as an object to be operated pans, tilts, and zooms, and the image displayed in the image window 134 also changes.

The operation buttons 120, 122, 124, and 126 are provided with respect to the moving directions of panning and tilting. The home position return button 128 allows an easy return of the camera apparatus as an object to be operated to the home position (the reference position, in this embodiment the center of the pivotal angles in the pan and tilt directions). Since the home position return button 128 is arranged in the central empty space of the operation buttons 120 to 126, the user can visually readily understand that this button is for a return to the home position. This improves the operability. Enlargement and reduction of the zoom operation can be distinguished by providing one zoom operation designation button and clicking the button by using one of first and second buttons 138a and 138b and the mouse 138. It is also possible to assign the functions of the operations buttons 120 to 132 to predetermined keys on the keyboard.

[Operation Method]

The operation of the above embodiment will be described below by taking an actual TV conference as an example. Before beginning of the TV conference, the TV conference software 64 and 70, the camera management server 68, the camera control server 66, and the camera control client 72 are started. Although it is desirable that these software be started in the order named when their respective functions are taken into consideration, it is also possible to simultaneously start the software when the power switch of the camera apparatus 58 is turned on. It is obvious that to participate in a TV conference already being held, the user need not start the camera management server 68.

To take part in the TV conference in this condition, the user depresses the camera status list acquisition button 110 to display the camera status list 80 in the list window 136, selects a camera apparatus which he or she wishes to operate from the list, and depresses the access start button 112. Consequently, the function access_begin_1 described previously is executed and the access request described previously is performed, making remote control of the designated camera apparatus possible. To leave the TV conference, the user pushes the access end button 114. Accordingly the function access_end_1 is executed. In this stage an image from the camera apparatus which has been accessed before the access end is still displayed in the image window 134. To quit all operations, the user pushes the quit button 118.

[Access Limiting Mode]

In this embodiment it is also possible to limit the operation range of a camera apparatus for each individual user. This embodiment is provided with a complete permission mode which permits all of pan, tilt, and zoom operations, a total inhibition mode which does not permit any of pan, tilt, and zoom operations, and a restricted permission mode as an intermediate mode in which operations can be performed within a limited range. In the following description, the perfect permission mode, total inhibition mode, and restricted permission mode will be referred to as modes 1, 2, and 3, respectively. The camera management server 68 stores and manages a mode management table, FIG. 13, which shows an access limiting mode set for each user, and a limiting range management table, FIG. 14, which shows an allowable range in the restricted permission mode. That is, the pan range, tilt range, and zoom range of a camera apparatus of a user to whom mode 3 is set are limited to ±5+, ±7°, and 60 to 70 mm as a focal length, respectively. It is also possible to divide the restricted permission mode into a plurality of modes (e.g., modes 3a, 3b, 3c, . . . ) and set different limiting ranges for these modes.

The limiting modes and the limiting ranges are set by the camera control server 66 of a workstation equipped with a camera apparatus. That is, the user of that workstation can freely set the limiting mode and the limiting range for the user of the camera apparatus by operating the mouse or the keyboard. For this purpose, a function set_limit_mode_1 shown in FIG. 17 is provided.

The camera control server 66 sets a camera name in a parameter camera_name having a structure defined by [struct limitation { . . . } limitation] and sets a user name in a parameter user_mode. The camera control server 66 also sets the limiting mode in a parameter limit_mode and the limiting ranges corresponding to mode 3 in parameters tilte_plus_angle, tilte_minus_angle, pan_plus_angle, pan_minus_angle, min_zoom, and max_zoom. The camera control server 66 then calls the function set_limit_mode_1.

Figures 17, 18:
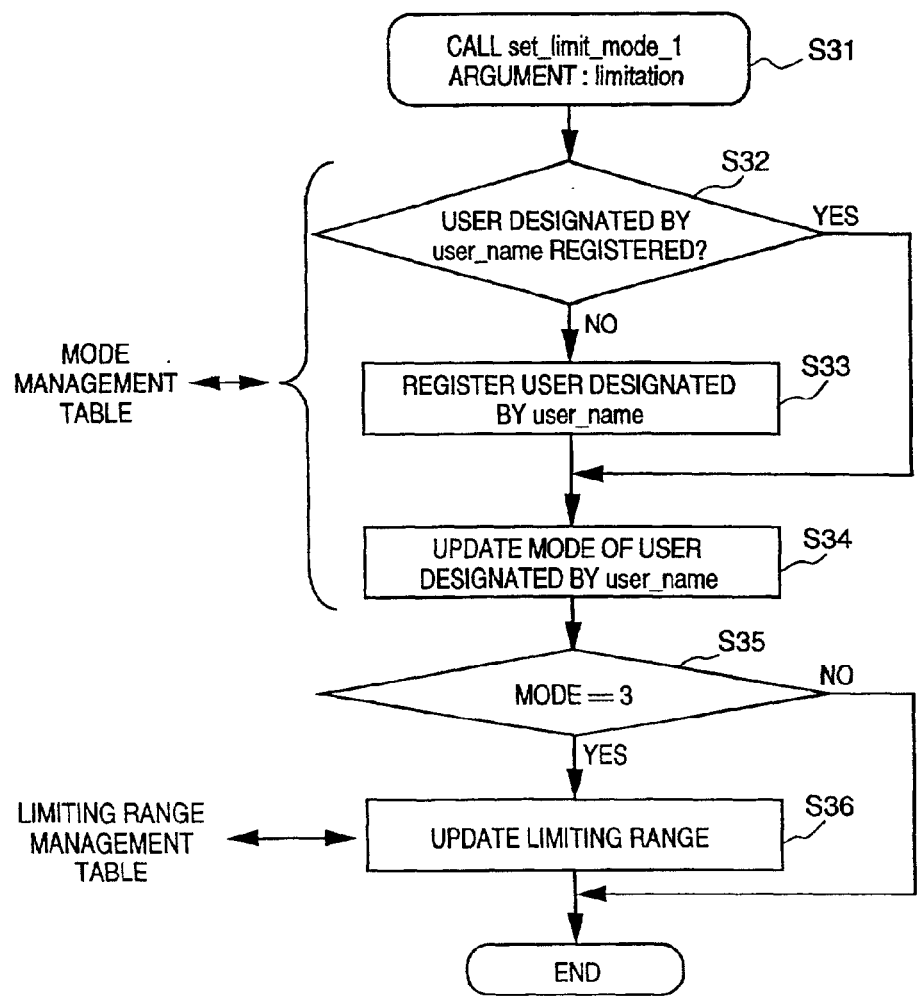
FIG. 17 is a view for explaining a function of updating a limiting mode.
FIG. 18 is a flow chart showing processing for a limiting mode update request.

FIG. 18 shows a flow chart of processing performed by the camera management server 68 when limiting mode update processing is requested. That is, when the limiting mode update processing is requested (S31), the camera management server 68 checks whether the designated user name is registered in the mode management table (S32). If the user name is not registered, the camera management server 68 registers the user name designated by the parameter user_name in the mode management table (S33). The camera management server 68 then sets the parameter limit_mode in the limiting mode of the designated user name (S34). If the mode is mode 3 (S35), the camera management server 68 sets the individual designated limiting ranges in the limiting range management table (S36).

Figure 15:
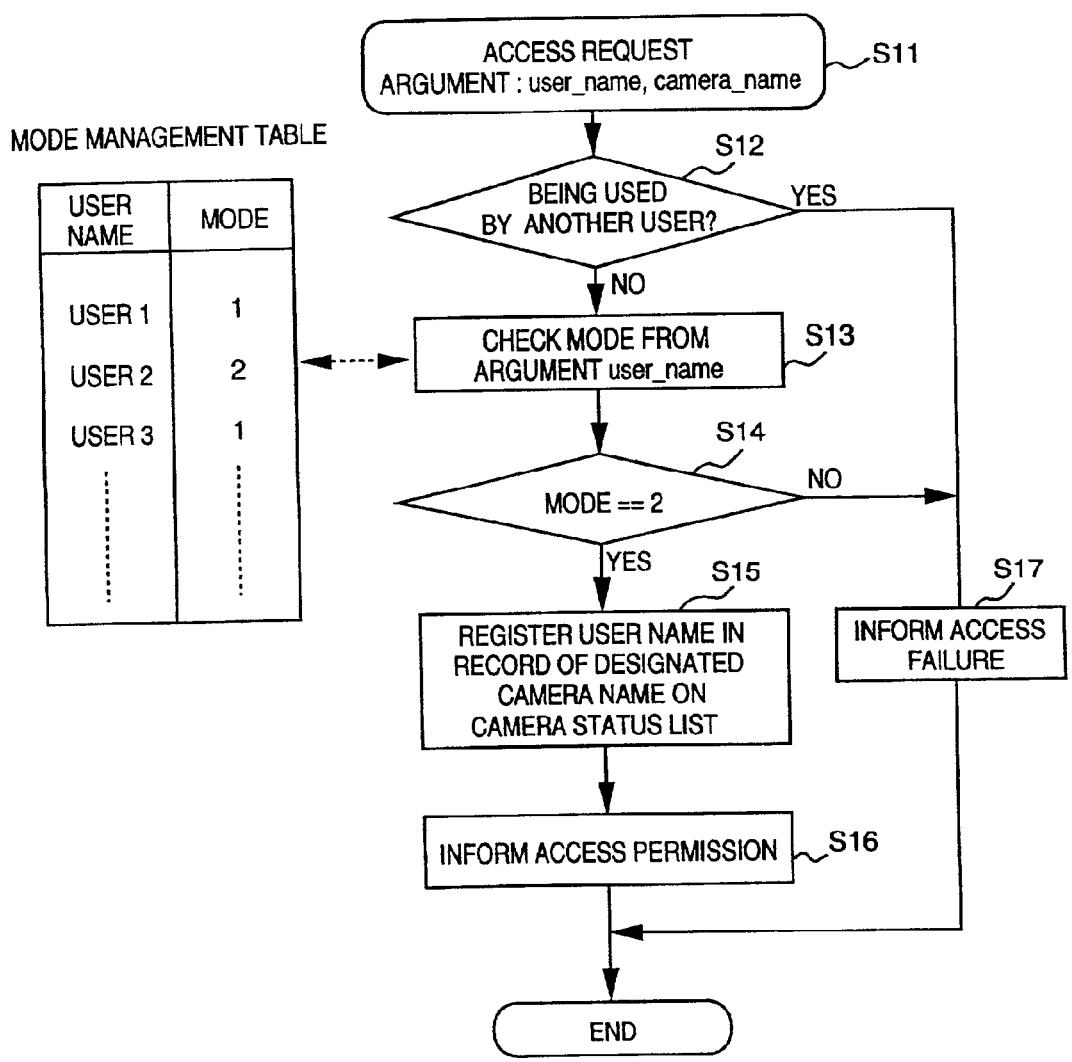
FIG. 15 is a flow chart showing processing for a lock request.

When the access control function access_begin_1 described earlier is executed, these mode management tables are referred to, and an access right is not granted to the user in mode 2. FIG. 15 shows a flow chart of processing performed by the camera management server 68 when access is requested. That is, when access is requested by using, as arguments, a user name indicating the person who intends to perform a remote operation and a camera name indicating the camera apparatus to be remotely operated (S11), the camera management server 68 checks by referring to the camera status list 80 whether the designated camera apparatus is being used by another user (S12). If the camera apparatus is already being used (S12), the camera management server 68 informs the request source that the camera apparatus is being used (S17).

If the designated camera apparatus is not being used (S12), the camera management server 68 checks the access limiting mode of the user from the mode management table (S13). If the access limiting mode is mode 2, the camera management server 68 informs the request source that control is inhibited (S17). If the mode is other than mode 2, the camera management server 68 registers the user name in the record of the designated camera name in the camera status list 80 (S15) and informs the request source of access permission (S16).

Note that mode 2 is set as a default value for users not registered in the mode management table.

Figure 16:
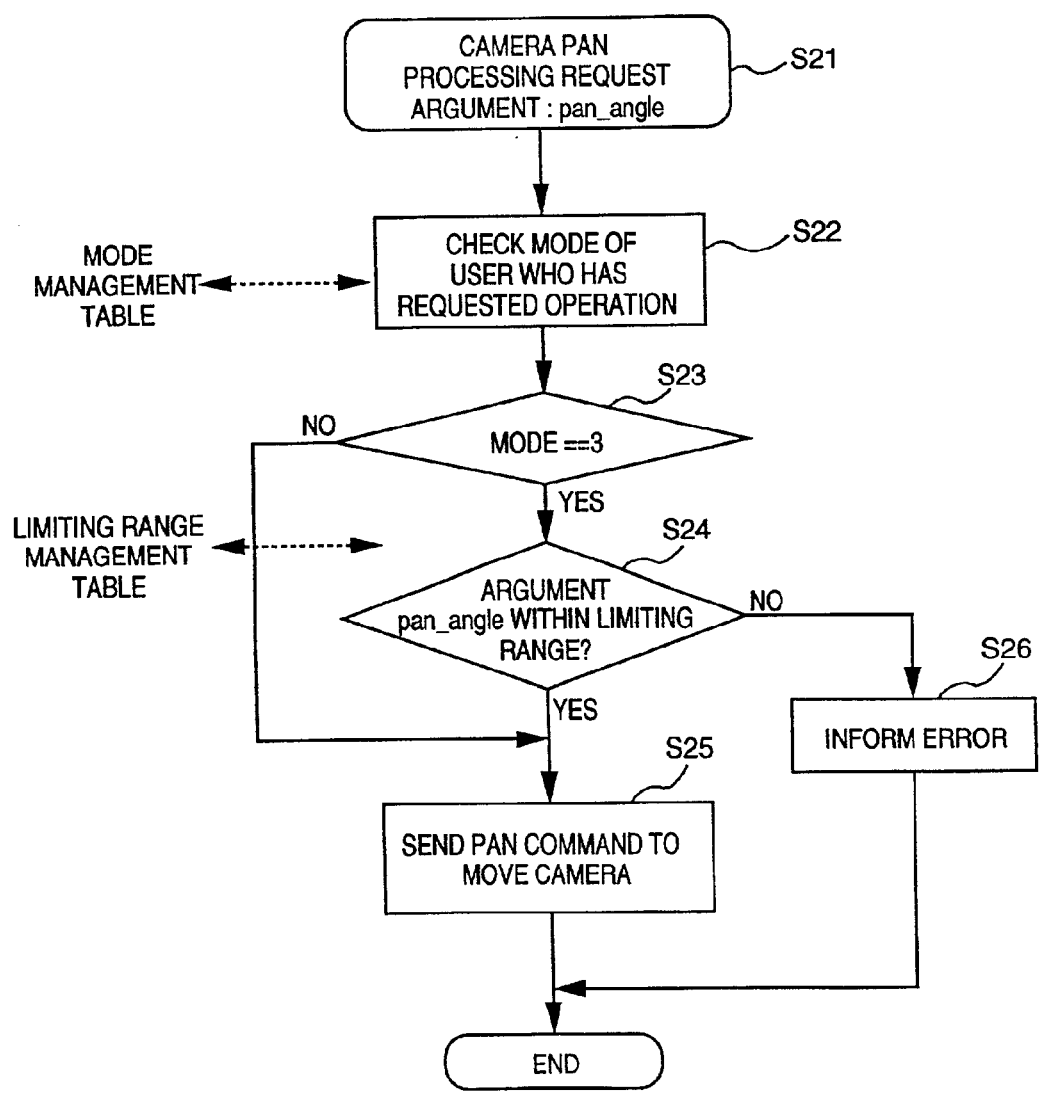
FIG. 16 is a flow chart showing processing for a pan request.

FIG. 16 shows a flow chart of processing performed by the camera control server 66 when a camera apparatus pan operation is requested. When camera panning in which the pan angle is designated by an argument pan angle is requested (S21), the camera control server 66 checks the access limiting mode of the user who has requested the camera operation (S22). If the access limiting mode is mode 3 (S23), the camera control server 66 checks in the limiting range management table whether the designated pan angle is within the limiting range (S24). If the pan angle is not within the limiting range (S24), the camera control server 66 does not pan the camera apparatus and informs the request source of an error (S26). If the pan angle is within the limiting range (S24), the camera control server 66 sends a pan command to move the camera apparatus to the designated pan angle (S25). If the access limiting mode is mode 1 (S23), the camera control server 66 bypasses step S24 and moves the camera apparatus to the designated pan angle (S25).

Although details will be omitted, processing for tilting or zooming of a camera apparatus is executed in the same manner as in FIG. 16. Also, since only users to whom access right is granted can request an operation of a camera apparatus, mode 2 is not detected in step S22.

In this embodiment as described above, a large number of users can remotely operate, where necessary, camera apparatuses connected to a network without stopping the system. This facilitates participation in and retirement from the TV conference. Furthermore, a plurality of access limiting mode steps are provided for a remote operation of a camera apparatus. Accordingly, the user of a workstation equipped with a camera apparatus can set an imaging enable range including operation inhibition for each user who intends to remotely operate the camera apparatus.

Second Embodiment

[Hardware Configuration]

Figure 19:
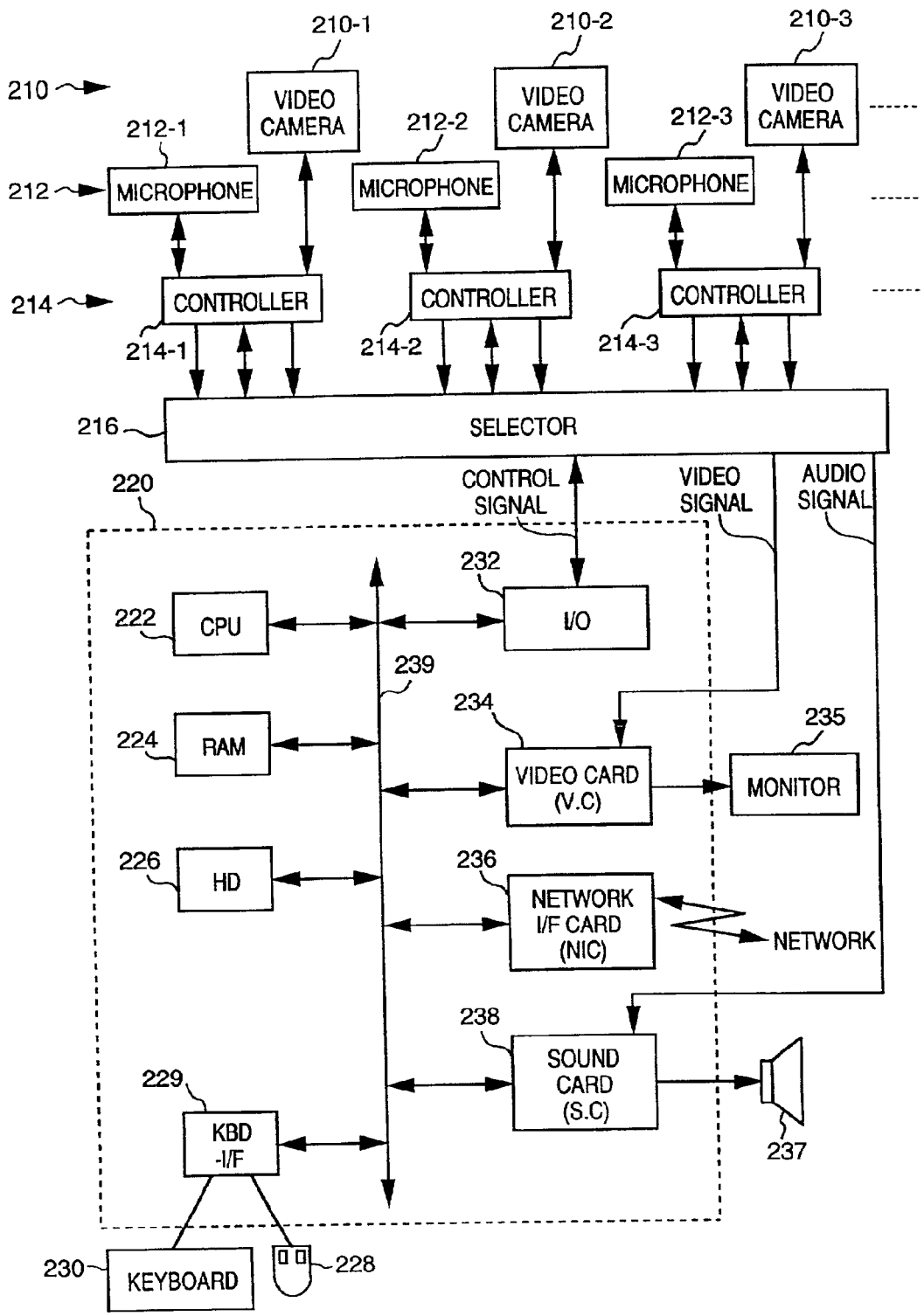
FIG. 19 is a schematic block diagram showing the basic configuration of a computer system of the second embodiment.

FIG. 19 is a block diagram showing an outline of the configuration of a video communication apparatus as a basic element in the second embodiment of the present invention, i.e., a computer system to which cameras and microphones are connected. One or more computers having the configuration shown in FIG. 19 and one or more computers having a similar configuration are interconnected via a computer network.

In FIG. 19, reference numerals 210-1, 210-2, 210-3, ..., denote video cameras; 212-1, 212-2, 212-3, ..., microphones essentially attached to the video cameras 210; and 214-1, 214-2, 214-3, ..., controllers which directly control panning, tilting, zooming, focus adjustment, and aperture of the video cameras 210 and audio inputs from the microphones 212-1, 212-2, 212-3, ..., in accordance with external control signals. A selector 216 selects a video camera 210 (and a microphone 212) to be controlled and thereby selects output signals (video and audio signals) from the camera and microphone. A general-purpose interface such as an RS232C interface can be used for control signals. However, it is evident that the present invention is not restricted to this interface.

A terminal or computer 220 controls the selector 216 to send a control command to a desired controller 214 via the selector 216, thereby controlling the video camera 210 and the microphone 212 connected to the controller 214.

This computer 220 includes a CPU 222 for controlling the overall computer 220, a RAM 224 as a main storage, a hard disk drive (HD) 226 as a secondary storage, and a keyboard interface (HBD-I/F) 229 to which a pointing device 228 such as a mouse and a keyboard 230 are connected.

An I/O port 232 connects the selector 216 to supply a control command and the like to the controller 214 via the selector 216. A video card (V.C) 234 inputs an output video signal from the video camera 210 selected by the selector 216 and displays various images on a monitor 235. A network interface card (NIC) 236 connects the computer 220 to a computer network or a communication network. A sound card (S.C) 238 inputs an output audio signal from the microphone 212 attached to the video camera 210 selected by the selector 216 and reproduces various sounds from a loudspeaker 237. Note these devices in the computer 220 are interconnected by a system bus 239.

It is possible to send a camera control signal from a remote place to the network interface card 236 via the network and operate a given video camera 210 (and a microphone 212).

The selector 216 selects one of the controllers 214 and supplies output video and audio signals from the selected controller 214 to the video card 234 and the sound card 238, respectively. The selector 216 also logically connects a control signal line connected to the selected controller 214 to the I/O port 232. An NTSC composite signal and a luminance/color-difference separation type NTSC signal can be used as the video signal.

The video card 234 inputs the video signal selected by the selector 216 and converts the input signal into a digital signal (a video capture function). The video card 234 displays the image of the signal in a predetermined window of the monitor 235. The digital video signal is supplied to the CPU 222. The CPU 222 processes the signal by using the RAM 224 or stores the signal in the hard disk 226.

The sound card 238 inputs the audio signal selected by the selector 216, converts the input signal into a digital signal, and reproduces the sound of the signal from the loudspeaker 237. The digital audio signal is supplied together with the digital video signal to the CPU 222. The CPU 222 processes the signal by using the RAM 224 or stores the signal in the hard disk 226.

The hard disk 226 stores initialization information of the video camera 210 (and the microphone 212) and management information pertaining to an access right. Details of these pieces of information will be described later.

If only one video camera 210 (and one microphone 212) are connected to the computer 220, the selector 216 is unnecessary and the controller 214 is directly connected to the I/O port 232. Also, if no sound needs to be input, the microphone 212 is unnecessary. Furthermore, if neither image nor sound needs to be input, the video camera 210, the microphone 212, the controller 214, and the selector 216 are unnecessary. In this embodiment, however, it is assumed that at least one video camera 210 is arranged near and connected to at least one computer 220 connected to the network.

[Network Connection]

Figure 20:
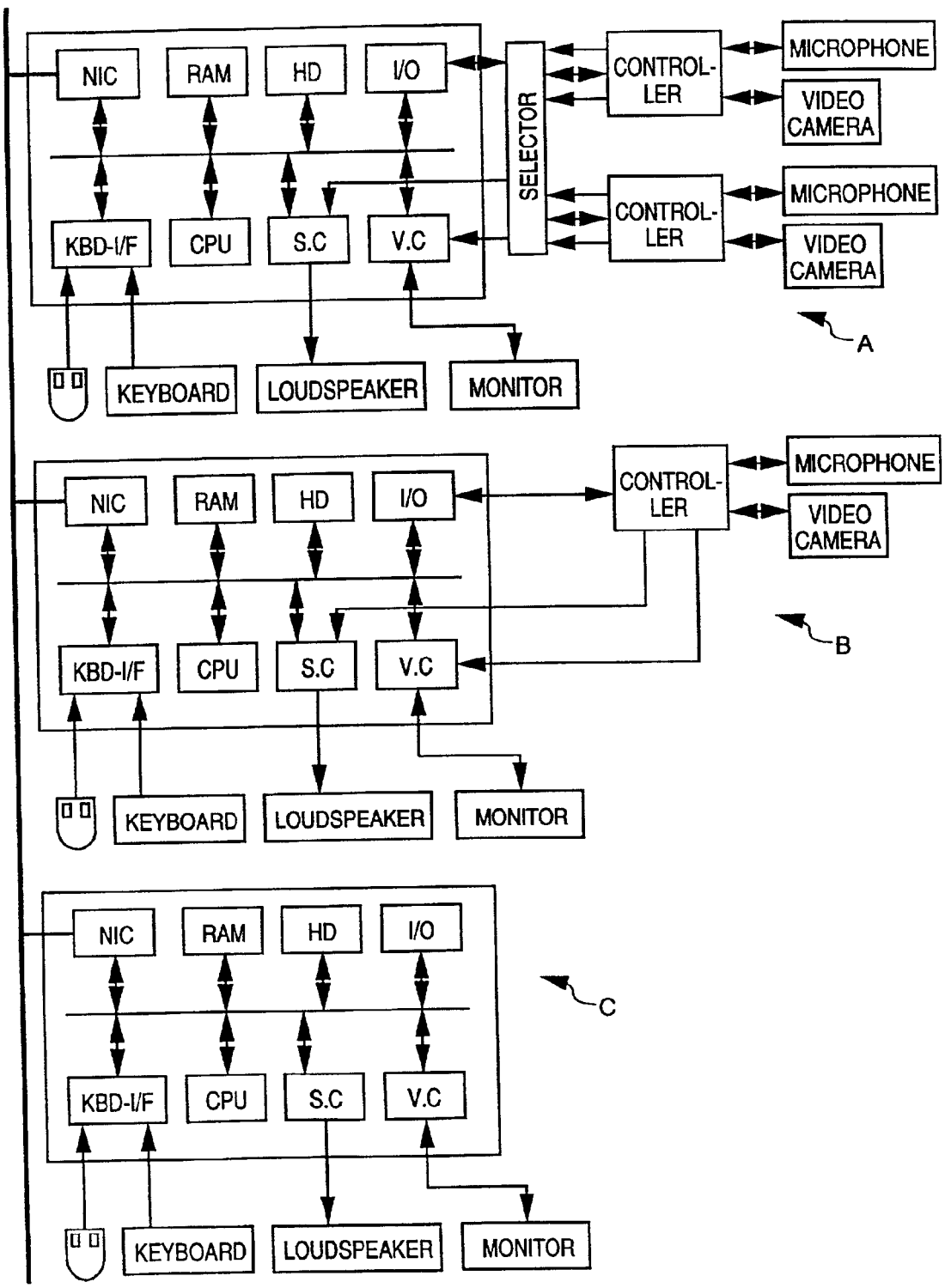
FIG. 20 is a schematic block diagram showing a hardware configuration in a network.

The apparatus shown in FIG. 19 is connected to a network in such a way as, for example, illustrated in FIG. 20. A terminal A has the same configuration as in FIG. 19. Since only one video camera 210 and only one microphone 212 are connected to a terminal B, in this terminal B the controller 214 is directly connected to the I/O port 232. Also, no video camera 210 and no microphone 212 are connected to a terminal C. Generally, the terminals A, B, and C having these different configurations simultaneously exist in one network.

As the network used in this embodiment, a LAN (Local Area Network) or a WAN (Wide Area Network) having an enough transmission bandwidth to transmit digital motion image data, digital audio data, and a remote operation signal is assumed. Before being transmitted, information of the motion image data and the audio data are compressed in accordance with an existing compression coding method. However, a detailed description of the compression/expansion processing will be omitted since the processing itself has no direct relation to the present invention. No such information compression is necessary if the network has a sufficient transmission capacity.

The CPU 222 packetizes the video data and the audio data supplied from the video card 234 and the sound card 238 and outputs the packets to the network via the network interface card 236. Requests including a camera operation request and a camera switch request also are packetized and sent from the network interface card 236 to the network. Additionally, a packet of information concerning the overall system is sent to the network. These pieces of information are transmitted to only specific terminals or to all terminals in accordance with the contents of the transmission data and with the necessity.

Reception is done in the same manner as above. That is, when receiving packetized video data, audio data, camera operation request, and camera switch request, each of the terminals A, B, and C processes the received video and audio data in the same fashion as for input data from the video camera and the microphone directly connected to the terminal, and processes the received camera operation request and camera switch request in the same manner as for input similar requests from the keyboard or the like device. The information concerning the overall system is used to update system display of a user interface (to be described later).

[Software Configuration]

Figure 21:
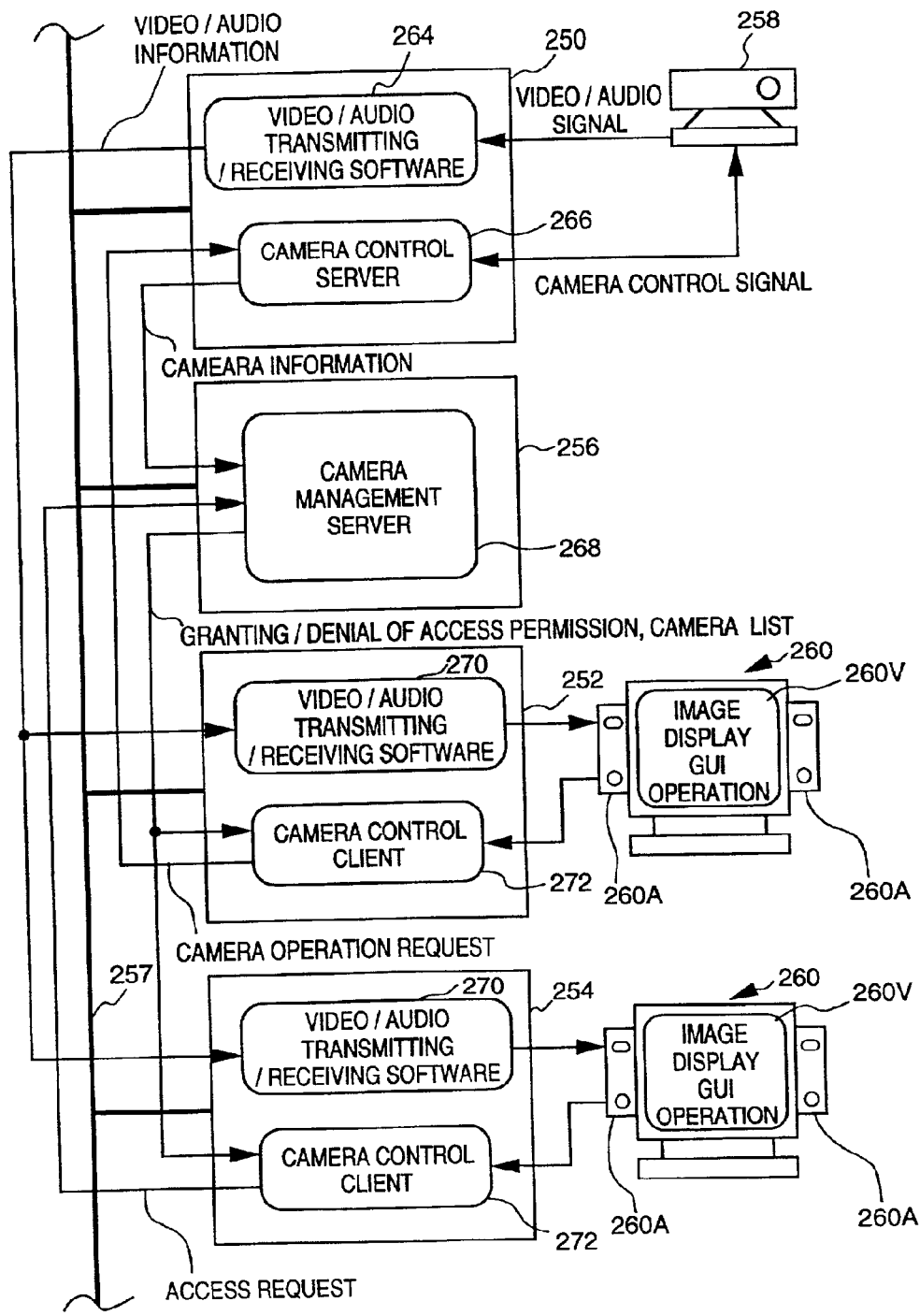
FIG. 21 is a schematic block diagram showing a software configuration in a network.

FIG. 21 shows the software configuration in this embodiment. FIG. 21 separately illustrates software (server)

installed in a terminal to which a camera apparatus is directly connected and software (client) installed in a terminal which remotely operates the camera apparatus. In a normal use condition, both the software are of course installed in each terminal.

Referring to FIG. 21, workstations 250, 252, 254, and 256 are connected to a network 257. A camera apparatus 258 with a microphone corresponding to the video camera 210 and the microphone 212 is connected to the workstation 250. A video/audio output apparatus 260 in which a loudspeaker 260A is integrated with a monitor 260V is connected to each of the workstations 252 and 254. As will be described later in detail, the workstation 256 manages camera apparatuses capable of being remotely controlled via a network, the access right of each user to a camera apparatus, and the use state of each camera apparatus.

Video/audio transmitting/receiving software 264 and a camera control server (software) 266 are installed in the workstation 250. The video/audio transmitting/receiving software 264 transmits video/audio information obtained by the camera apparatus 258 to other workstations via the network 257. The camera control server 66 controls the camera apparatus 258 in accordance with camera operation requests from the workstations 252 and 254.

A camera management server (software) 268 is installed in the workstation 256. The camera management server 268 manages all the cameras apparatuses 258 connected to the network 257. It is only necessary to install the camera management server 263 in one of the terminals connected to the network 257.

When activated, the camera control server 266 reads in the initialization information of all the camera apparatuses 258 connected to the workstation 250 and informs the camera management server 268 of the camera names and the initial states (the installation position, the initial direction, and the zoom value) of all the camera apparatuses. In accordance with a registration request from the camera control server 266, the camera management server 268 registers, in the camera list, information indicating that the camera apparatuses 258 connected to the workstation 250 are actually made usable via the network 257.

Video/audio transmitting/receiving software 270 and a camera control client (software) 272 are installed in each of the workstations 252 and 254. The video/audio transmitting/receiving software 270 receives the video/audio information from the workstation 250 and causes the video/audio output apparatus 260 to reproduce the information. The camera control client 272 displays the state of a camera apparatus (in this case the camera apparatus 258) connected to the network 257. Also, the camera control client 272 displays a camera display control panel (to be described in detail later) for remotely operating an operable camera and processes the operation. As will be described later in detail, the users of the workstations 252 and 254 can refer to, register, and update various information managed by the camera management server 268 by using the camera control client 272. If the camera management server 268 permits a remote operation of a camera apparatus (in this case the camera apparatus 258) of another workstation, the camera control client 272 can directly transmit a camera operation request to the camera control server 266 without passing the request through the camera management server 268.

In a normal use condition, both of the video/audio output apparatus 260 and the camera apparatus 258 (a monitor and a video camera if reproduction of sound is omitted) are usually connected to each workstation. Accordingly, the video/audio transmitting/receiving software 264 and 270 usually have both functions of transmitting and receiving video/audio information. Generally, the video/audio transmitting/receiving software and other software consist of a single program or a group of program modules. Each of the terminals A and B shown in FIG. 20 consists of the workstation 250, and the terminal C in FIG. 20 consists of the workstation 252 or 254. The workstation 256 in FIG. 21 is one of the terminals A, B, and C in FIG. 20.

The camera management server 268 is software which manages all of the camera apparatuses connected to the network 257. That is, the camera management server 268 holds information such as the camera names, installation positions, directions, use states, and access rights of all the camera apparatuses connected to the network 257 and the host names of workstations to which the camera apparatuses are actually connected. The camera management server 268 registers a camera apparatus when the camera apparatus is connected to the network 257 and deletes the registration when the camera apparatus is disconnected from the network 257. Additionally, the camera management server 268 manages granting and denial of access permission for a camera access request from a user. Furthermore, the camera management server 268 informs, via the network 257, all the camera control clients 272 of the various information of the camera apparatuses connected to the network 257 either periodically or in accordance with a request.

[Control Panel]

Figure 22:
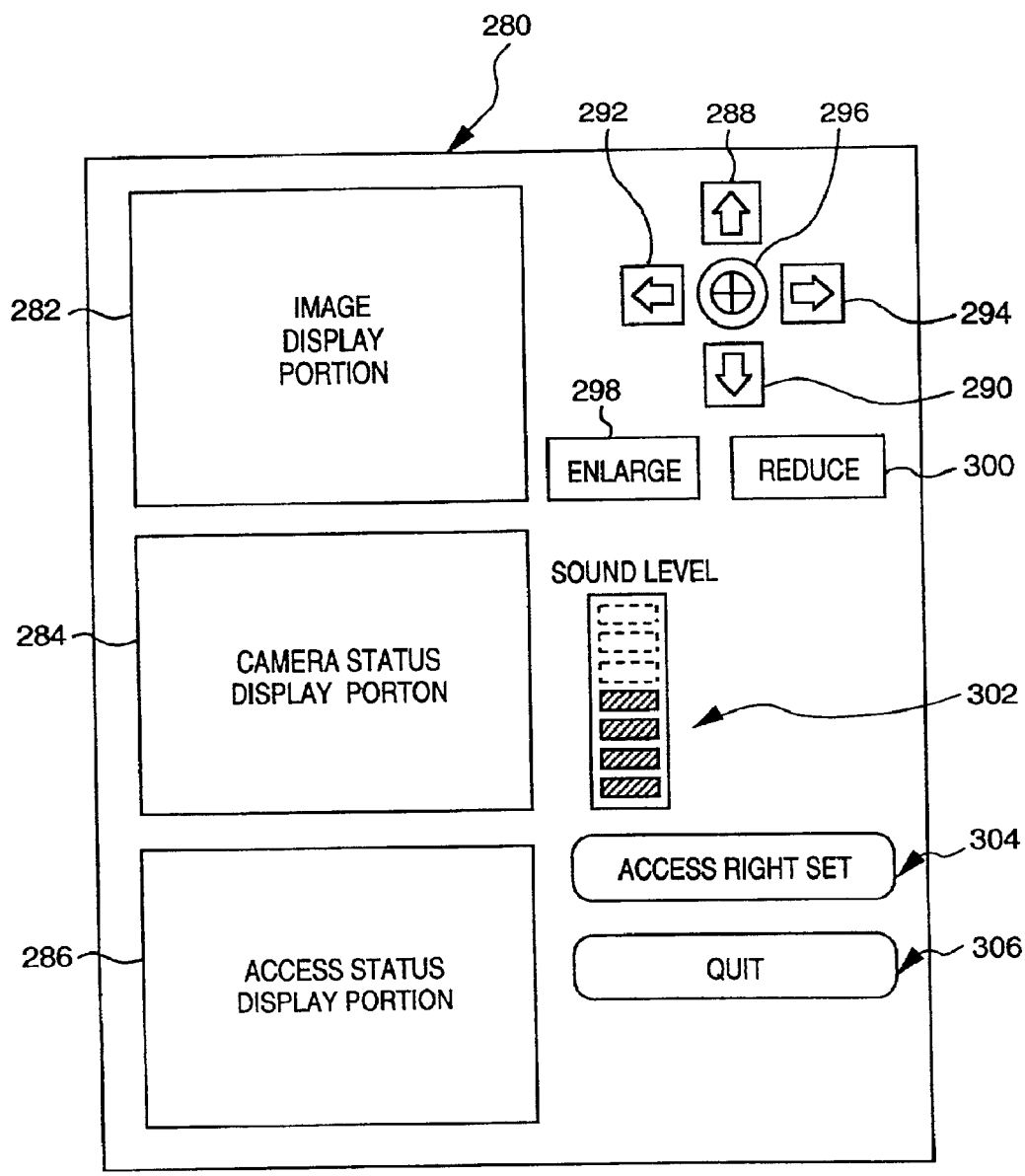
FIG. 22 is a view showing an example of the display screen of a camera control client.

FIG. 22 shows an example of an image display/operation screen displayed on the monitor 260V by the camera control client 272. Assume that a window system capable of simultaneously displaying a plurality of windows on the monitor 260V is operating in each of the terminals 252 and 254. This image display/operation screen 280 includes an image display portion 282 for displaying an image from a camera apparatus, a camera status display portion 284 for displaying the status of a camera apparatus, an access status display portion 286 for displaying an access status, camera operation buttons 288 to 300 for performing panning, tilting, and zooming of a camera apparatus, a sound level display portion 302 for displaying a sound level, an access right set button 304, and a quit button 306.

The camera status display portion 284 displays a camera status list as illustrated in FIG. 23. The information displayed contains, e.g., the camera names of all the camera apparatuses connected to the network 257, the host names of terminals to which these camera apparatuses are actually connected, the pan and tilt angles and zoom ratios of the camera apparatuses, and the owners and the use states of the camera apparatuses. The camera name is a specific name for identifying each camera apparatus. The pan and tilt angles represent the imaging direction of each camera apparatus. The owner represents a user having the right to set an access right to a camera apparatus of interest. The owner is commonly the user of a terminal to which a camera apparatus of interest is actually connected. In the column of use state the user name remotely operating the corresponding camera apparatus is displayed. If no user is remotely operating the corresponding camera apparatus, the column is left blank (or "unused" is displayed). In the following description, the information displayed in the camera status display portion 284 will be called a camera list.

The access status display portion 286 displays the user names receiving output video/audio information from his or her own terminal to other terminals. The access status display portion 286 also displays the user name remotely controlling the camera apparatus connected to his or her own terminal.

The camera operation buttons 288 to 300 are more specifically vertical tilt buttons 288 and 290, horizontal pan buttons 292 and 294, a zoom-up (enlarge) button 298, and a zoom-down (reduce) button 300 of a video camera. A home position return button 296 allows a video camera as an object to be operated to easily return to the home position (the reference position, in this embodiment the center of the pivotal angles in the pan and tilt directions).

The sound level display portion 302 displays the sound level of audio information.

If a user desires to access (remotely operate or receive video/audio information from) an arbitrary camera apparatus connected to a given terminal, the user selects the corresponding row of the camera list displayed in the camera status display portion 284 by, e.g., double click. The camera control client 272 transmits an access request for the selected camera apparatus to the camera management server 268. As will be described in detail later, the camera management server 268 determines granting/denial of permission to access by taking account of the access right set state, and informs the camera control client 272 of the request source of the result. If the access is permitted, the camera control client 272 can access the selected camera apparatus. Consequently, an image taken by that camera apparatus is displayed in the image display window 282, and a sound such as voices collected by the microphone attached to the camera apparatus is output from the loudspeaker. Additionally, the user can remotely control the direction and zooming of the video camera by using the camera control buttons 288 to 300.

[Access Right]

A method of setting an access right to a camera apparatus according to the present invention will be described below. The concept of the access right will be described first. In this embodiment, the access right is set for an individual (user), and a log-in name to a terminal is used to identify an individual. In this embodiment, the access right can be set for image reception, voice reception, and camera operations.

Access rights to image reception and voice reception relate to whether a user (to be referred to as a "camera owner" hereinafter) having a management right to a certain camera permits other users to receive an image taken by the camera apparatus and voices collected by the camera apparatus. Analogously, an access right to camera operations relates to whether the camera owner of a certain camera apparatus permits other users to perform panning, tilting, and zooming of a video camera of the camera apparatus. Additionally, in this embodiment partial permission intermediate between granting and denial of permission is provided for camera operations. That is, in this partial permission mode camera operations such as panning, tilting, and zooming are permitted by limiting the ranges of these camera operations.

Although the access right to voice reception and the access right to image reception can be independently set, the access right to image reception is subject to the access right to camera operations. That is, reception of only voices, reception of only an image, and simultaneous reception of voices and an image are possible, but camera operations without reception of an image are impossible. Accordingly, camera operations and image reception are always integrally permitted.

[Management of Access Right]

In this embodiment, users are classified into three categories, a system manager, camera owners, and general users, as in the case of access management of a computer network. A system manager is privileged to set and change access rights to all camera apparatuses connected to the network. Camera owners have rights to set and change access rights to their own camera apparatuses. However, until a camera owner changes setting done by a system manager an access right to the camera apparatus follows the setting done by the system manager. General users are users who are not a system manager. A general user accesses a camera apparatus of another user.

Camera owners are further classified into a person who has installed a camera apparatus (this person will be referred to as an "installer" hereinafter) and a person who is currently using the terminal connected to the camera apparatus (this person will be referred to as a "log-in user" hereinafter since the person may be temporarily logging in the terminal).

Generally, the installer and the log-in user are not the same person. The log-in user preferably has a right to set and change an access right to at least a camera apparatus which is installed near the terminal which he or she is logging in and which can take his or her image. In this embodiment, the following rule is applied as a method of determining a camera owner. That is, a camera owner is unconditionally an installer. However, if a log-in user is present at a terminal to which a camera apparatus is connected, this log-in user is a camera owner.

To restrict transmission of video/audio information, limitations on access rights which camera owners impose with respect to general users is of most importance. FIG. 24 shows an example of setting of access rights. More specifically, FIG. 24 illustrates the contents of access rights which a camera owner of a certain camera apparatus sets for general user 1 to general user n. Voice reception, image reception, and a camera operation are independently permitted or inhibited for each general user. When a camera operation is partially permitted (e.g., in the case of user 2), a table indicating a permitting range (or an inhibiting range) is separately prepared and linked.

In a method in which an access right is managed for each individual user, the management becomes cumbersome if the number of general users increases. It is therefore convenient to gather users, for whom the same access right is set, into one user group and set and change access rights in units of groups. As an example, since the access rights of users 1 and 3 in FIG. 24 have the same contents, these users 1 and 3 are assembled into a single user group. This facilitates setting and changing access rights having the same contents. FIGS. 25A and 25B show examples of setting of access rights for user groups. In FIGS. 25A and 25B, users having access rights with the same contents in FIG. 24 are grouped.

Depending on the state of a camera owner, it is sometimes desirable to dynamically change an access right. Examples are cases when a camera owner wishes to concentrate on a job, to use a camera by himself or herself, and to fully utilize the performance of the terminal. That is, it is preferable that a camera owner can dynamically change, i.e., limit the access right of each general user independently of the access right set for the general user. However, it is time-consuming to dynamically change the access rights of all user groups. Therefore, a plurality of access modes having different contents of access rights are provided and switched in accordance with a situation. Consequently, the contents of an access right can be easily changed. FIGS. 26A, 26B, and 26C show examples of the access modes. Referring to FIGS. 26A, 26B, and 26C, three access modes, open, normal, and close, are provided. In the open mode in FIG. 26A, voice reception, image reception, and a camera operation are permitted for user groups 1 and 2, and only a camera operation is inhibited for other user groups. In the normal mode in FIG. 26B, voice reception, image reception, and a camera operation are permitted for user group 1, voice reception and image reception are permitted for user group 2, and all of voice reception, image reception, and a camera operation are inhibited for other user groups. In the close mode in FIG. 26C, image reception is permitted only for user group 1, and all rights are inhibited for user group 2 and other user groups.

Even when the concepts of user groups and access modes as described above are introduced, it is tedious for a camera owner to perform these settings from the beginning each time he or she starts the system of a terminal. Therefore, the set conditions of each user, each user group, and each access mode are filed into an access right set file, and an access right is automatically set by referring to this access right set file upon start-up. When the system of a terminal is turned off, the set conditions are, of course, automatically stored in the access right set file.

When the system of a terminal is started for the first time, no access right set file is present in some instances. If this is the case, default values having predetermined contents are set as access rights. A camera owner need only make changes, where necessary, on the basis of the default access right set contents.

Also, it is not necessary to set access rights to camera apparatuses installed in halls or public places, and so all users can be permitted to access these camera apparatuses. For this purpose, a private mode in which access rights are set and a public mode in which no access right is set are provided.

Generally, access rights are set in units of camera apparatuses. However, if a certain user is the owner of a plurality of camera apparatuses and wishes to perform the same setting for some of the camera apparatuses, it is convenient to be able to set the same access right by defining these cameras as a camera group. An access right set GUI (Graphical User Interface) provides this camera group function.

[Setting of Access Right]

Details of the operation of setting and changing access rights in this embodiment will be described below. In the software configuration in FIG. 21, the camera control server 266 and the camera management server 268 cooperate to manage access rights and control accesses. More specifically, the camera management server 268 manages information of the overall system such as the use status of each camera apparatus and the set status of an access right to the camera apparatus. In accordance with the set access right, the camera management server 268 grants or denies permission to access in response to a request for transmission of audio and/or video information and a camera operation. If the ranges of camera operation parameters for panning, tilting, and zooming are restricted, the camera control server 266 rejects camera operation requests exceeding these permitting ranges.

The basic structure of access right control in this embodiment will be described in detail below for each of start-up of the system, an access request, and setting of an access right.

Figure 27:
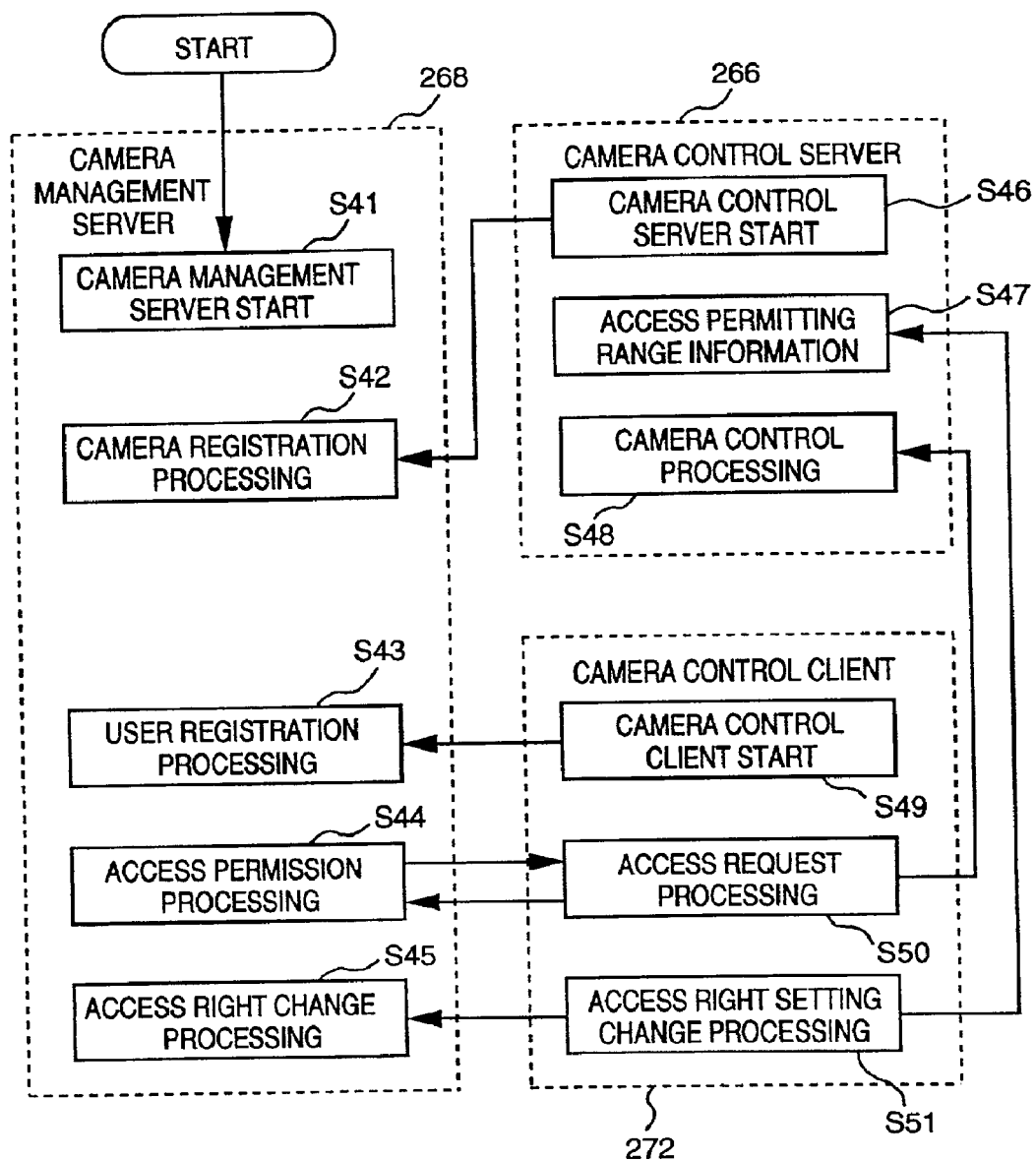
FIG. 27 is a view showing a procedure of starting the software in FIG. 21, requesting access, and setting access.
Figure 28:
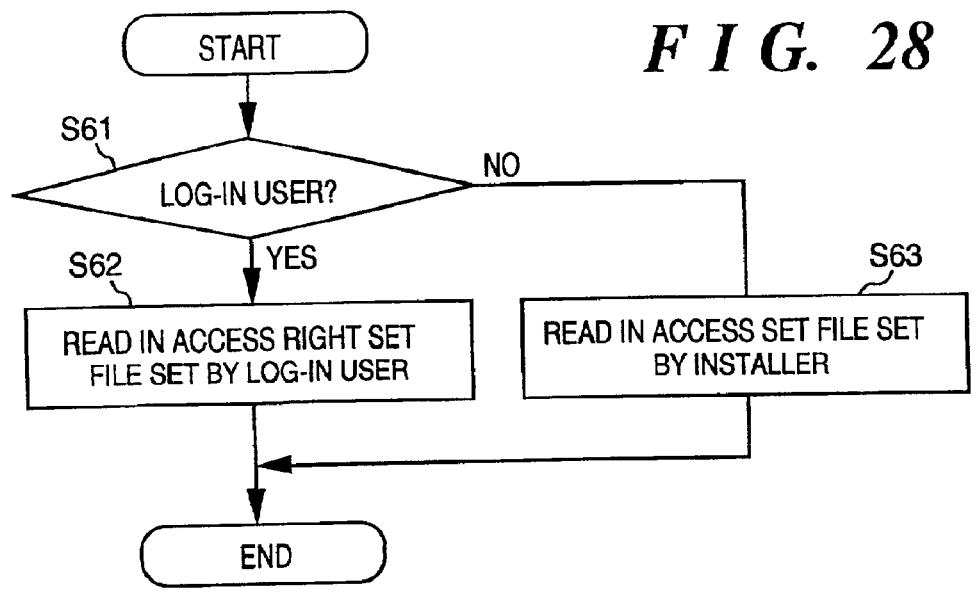
FIG. 28 is a flow chart showing processing of starting a camera control server.
Figure 29:
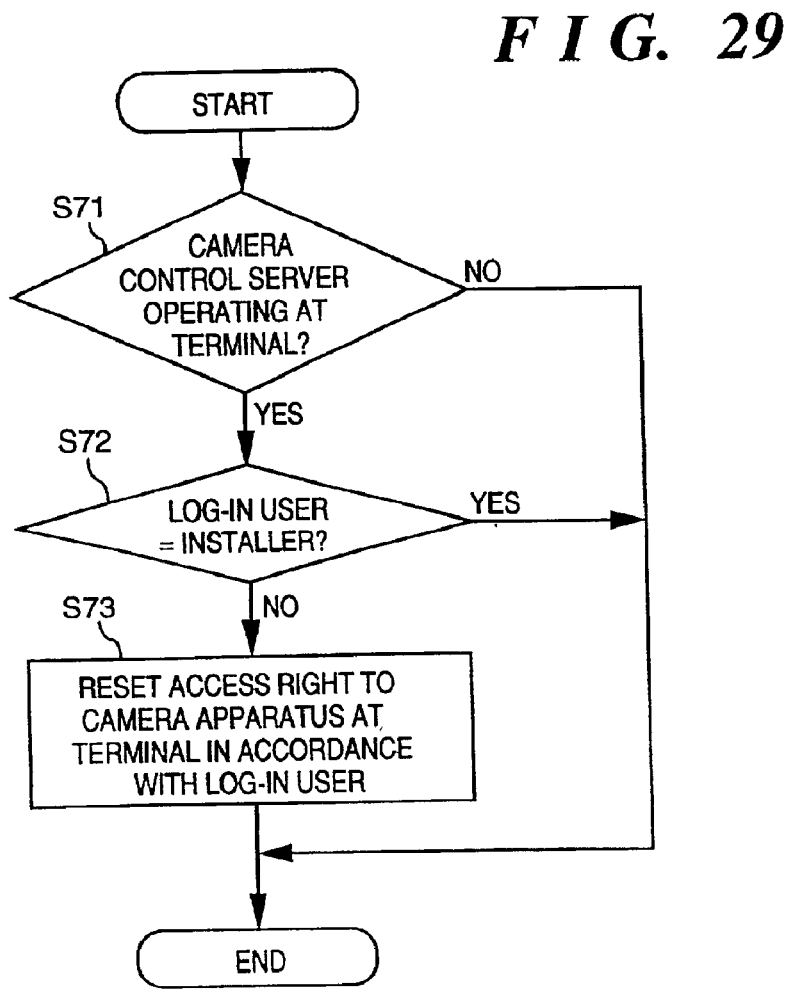
FIG. 29 is a flow chart showing access right set processing done by a camera management server with respect to a registration request from a camera control client.
Figure 30:
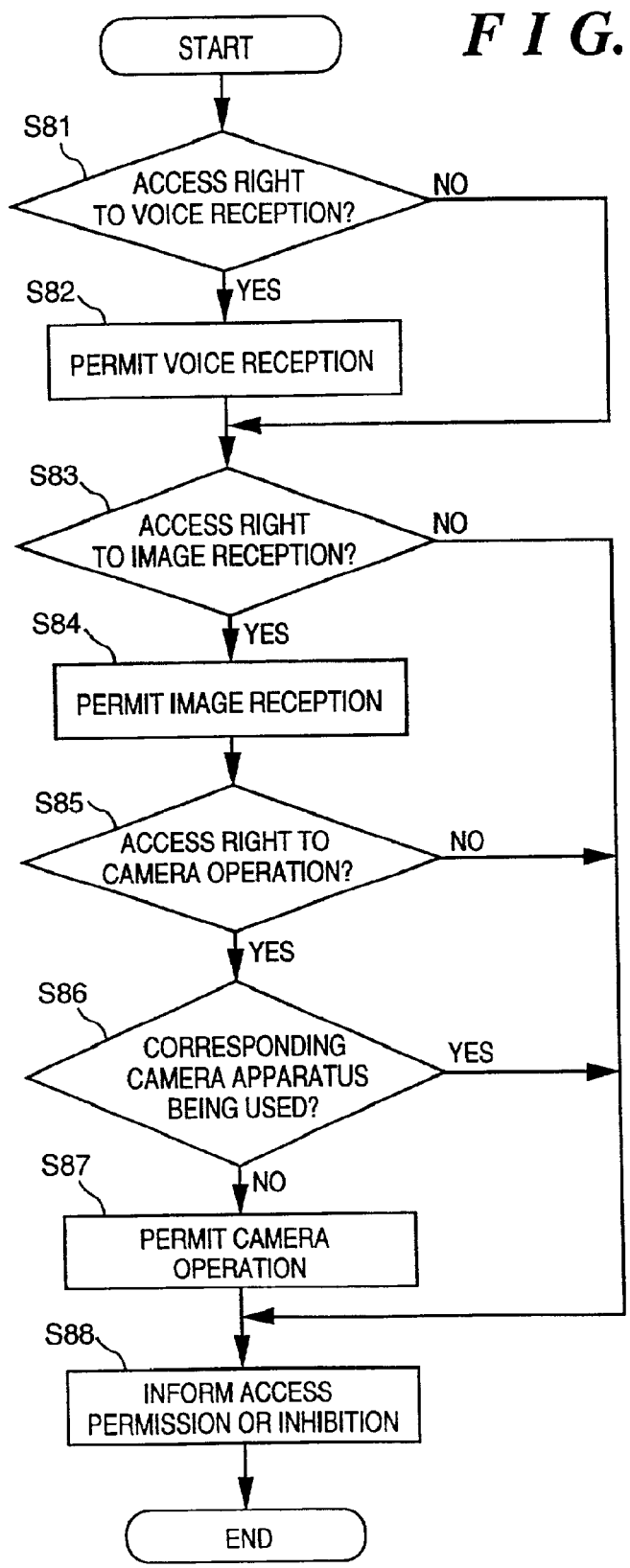
FIG. 30 is a flow chart showing access permission processing done by a camera control server with respect to an access request from a camera control client.

A procedure of starting the camera control server 266, the camera management server 268, and the camera control client 272 will be described below with reference to FIGS. 27 to 30. FIG. 27 shows the relationship between the camera control server 266, the camera management server 268, and the camera control client 272. FIG. 28 is a flow chart showing processing of starting the camera control server 266. FIG. 29 is a flow chart showing access set processing done by the camera management server 268 with respect to a registration request from the camera control client 272. FIG. 30 is a flow chart showing access permission processing done by the camera management server 268 with respect to an access request from the camera control client 272.

Figure 31:
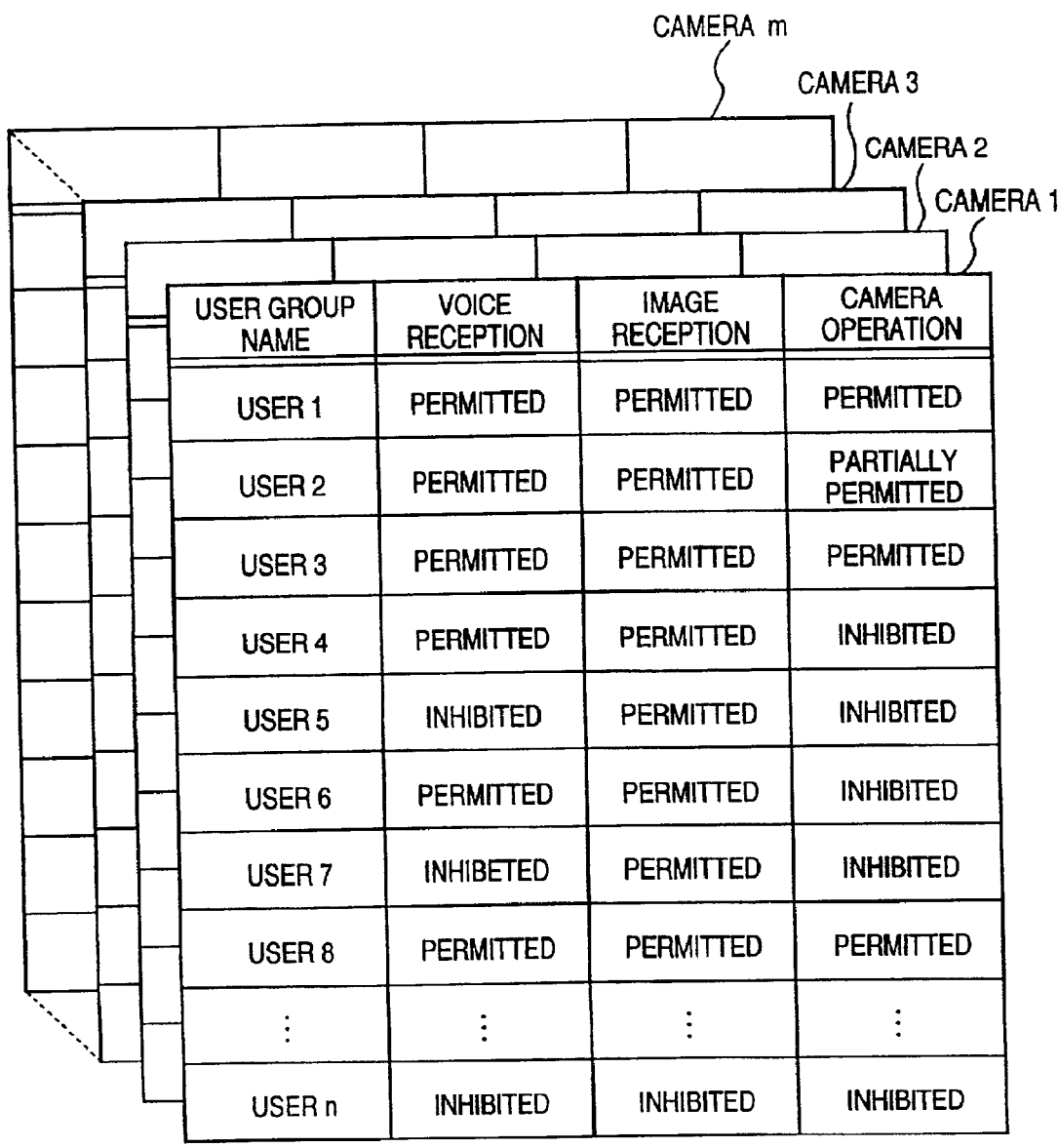
FIG. 31 is a view showing an access right set list held by a camera management server.

The camera management server 268 starts prior to all other software (S41). The camera management server 268 holds the camera list as shown in FIG. 23 and an access right set list as shown in FIG. 31. The access right set list records the set statuses of the access rights of all users to all camera apparatuses constituting the system. The camera management server 268 also holds a list of log-in users who start the camera control clients 272. After starting, the camera management server 268 waits until camera apparatuses are connected.

Subsequently, the video/audio transmitting/receiving software 264 and 270 start. Simultaneously, the camera control server 266 starts (S46). When starting, the camera control server 266 informs the camera management server 268 of camera information (the camera name, the host name, the installer name, and the status of a video camera).

The camera management server 268 registers the received camera information in the camera list and initializes access rights (S42). Also, the camera management server 268 informs all of the camera control clients 272 connected to the system that a camera apparatus is newly registered.

When a camera apparatus is installed near a terminal, initialization of an access right to the camera apparatus changes in accordance with whether a log-in user is present, as described previously. The presence of a log-in user is determined from the log-in user list held by the camera management server 268. As shown in FIG. 28, if a log-in user is present (S61), the camera management server 268 reads in an access right set file set by the user and initializes an access right (S62). If no log-in user is present (S61), the camera management server 268 reads in an access right set file set by an installer and initializes an access right (S63).

Subsequently, the camera control client 272 starts (S49). Immediately after starting, the camera control client 272 registers a log-in user in the camera management server 268 (S43), receives the system information such as the camera status list, and displays the camera list in the camera status display portion 284. As in FIG. 29, it is sometimes necessary to reset the access right. That is, if the camera control server 266 is operating at the same terminal (S71), the camera management server 268 checks whether the log-in user to be registered and the installer of a camera apparatus connected to the terminal are the same (S72). If the two are different (S72), the camera management server 268 changes the access right to the camera apparatus connected to the terminal in accordance with the log-in user (S73).

Only one camera management server 268 is necessarily started at an initially started terminal. On the other hand, the camera control server 266, the video/audio transmitting/receiving software 264 and 270, and the camera control client 272 are started at each terminal where necessary.

[Access Procedure]

An access procedure will be described next. First, the camera control client 272 requests the camera management server 268 to permit access to a camera apparatus (S50). The camera management server 268 processes this access request as shown in FIG. 30. That is, the camera management server 268 checks by referring to the access right set list, FIG. 31, whether the user of the camera control client 272 which has requested the access has an access right to receive voices from the camera apparatus (S81). If the user has the access right, the camera management server 268 sets a value indicating voice reception permission in the item of voice reception as a return value (S82). The camera management server 268 then checks whether the user has an access right to receive an image from the camera apparatus (S83). If the user has the access right, the camera management server 268 sets a value indicating image reception permission in the item of image reception as a return value (S84).

When permitting image reception, the camera management server 268 further checks whether the user has an access right to a camera operation of that camera apparatus (S85). If the user has the access right, the camera management server 268 checks by referring to the camera list whether another user is using the camera apparatus (S86). If no other user is using the camera apparatus (S86), the camera management server 268 sets a value indicating camera operation permission in the item of a camera operation as a return value (S87).

After the above processing, the camera management server 268 sends the return values indicating permission or rejection of the access request to the camera control client 272 of the request source (S88). If the access status is changed, the camera management server 268 simultaneously informs the camera control client 272 of the change of the access status. The camera control client 272 which has issued the access request accesses the objective camera apparatus for the permitted item (S50). The camera control server 266 transfers video/audio information or controls the operation of the camera apparatus in accordance with the request from the camera control client 272. However, if the access right of a user who wishes to perform a camera operation is a partially permitted one, the camera management server 268 accepts the camera operation within the permitting range described earlier (S48).

The other camera control clients 272 update the contents of the camera list displayed in the camera status display portion 284 on the basis of the information from the camera management server 268.

[Access Right Set Procedure]

Figure 44:
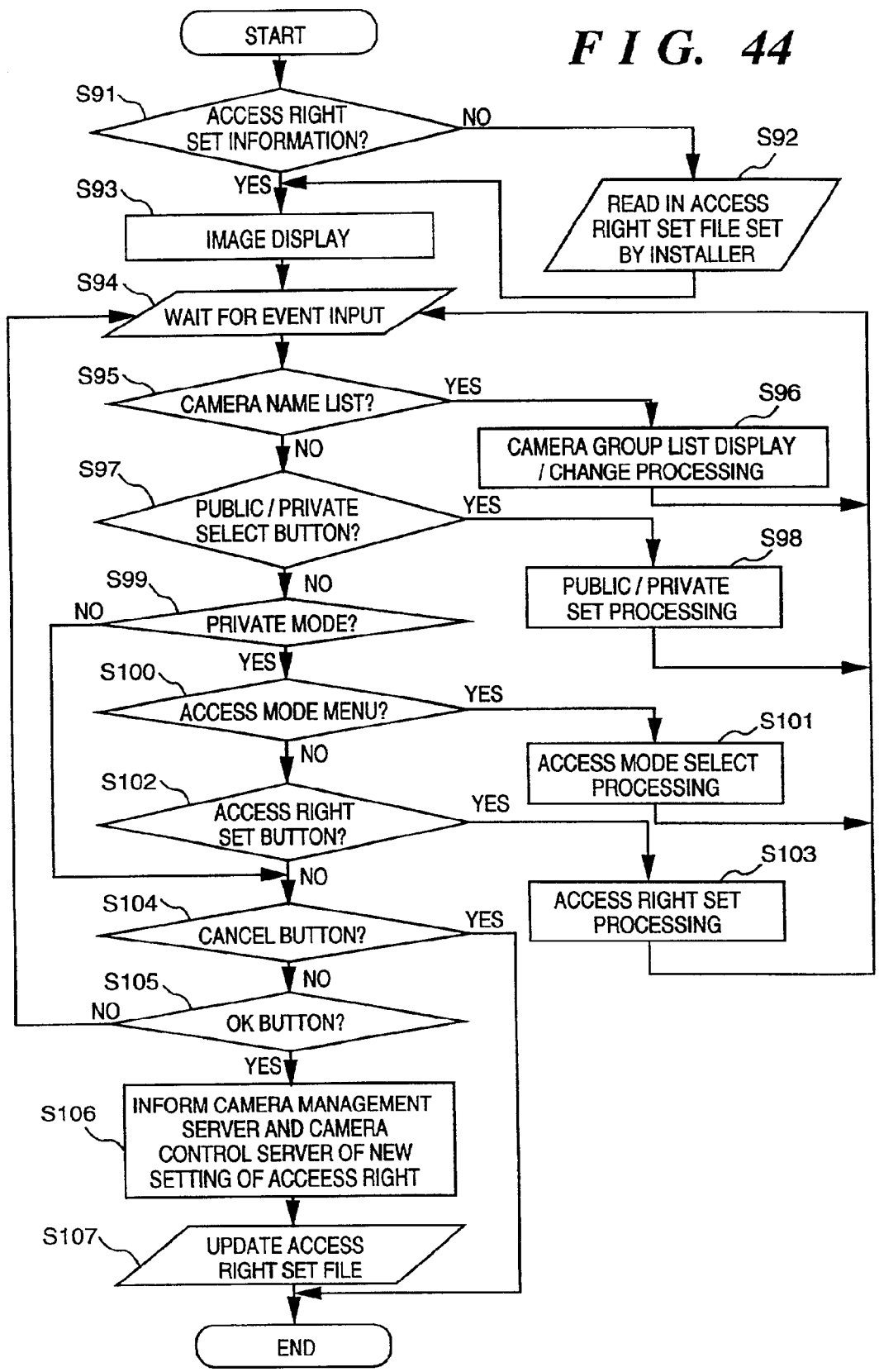
FIG. 44 is a flow chart showing processing of setting an access right.
Figure 45:
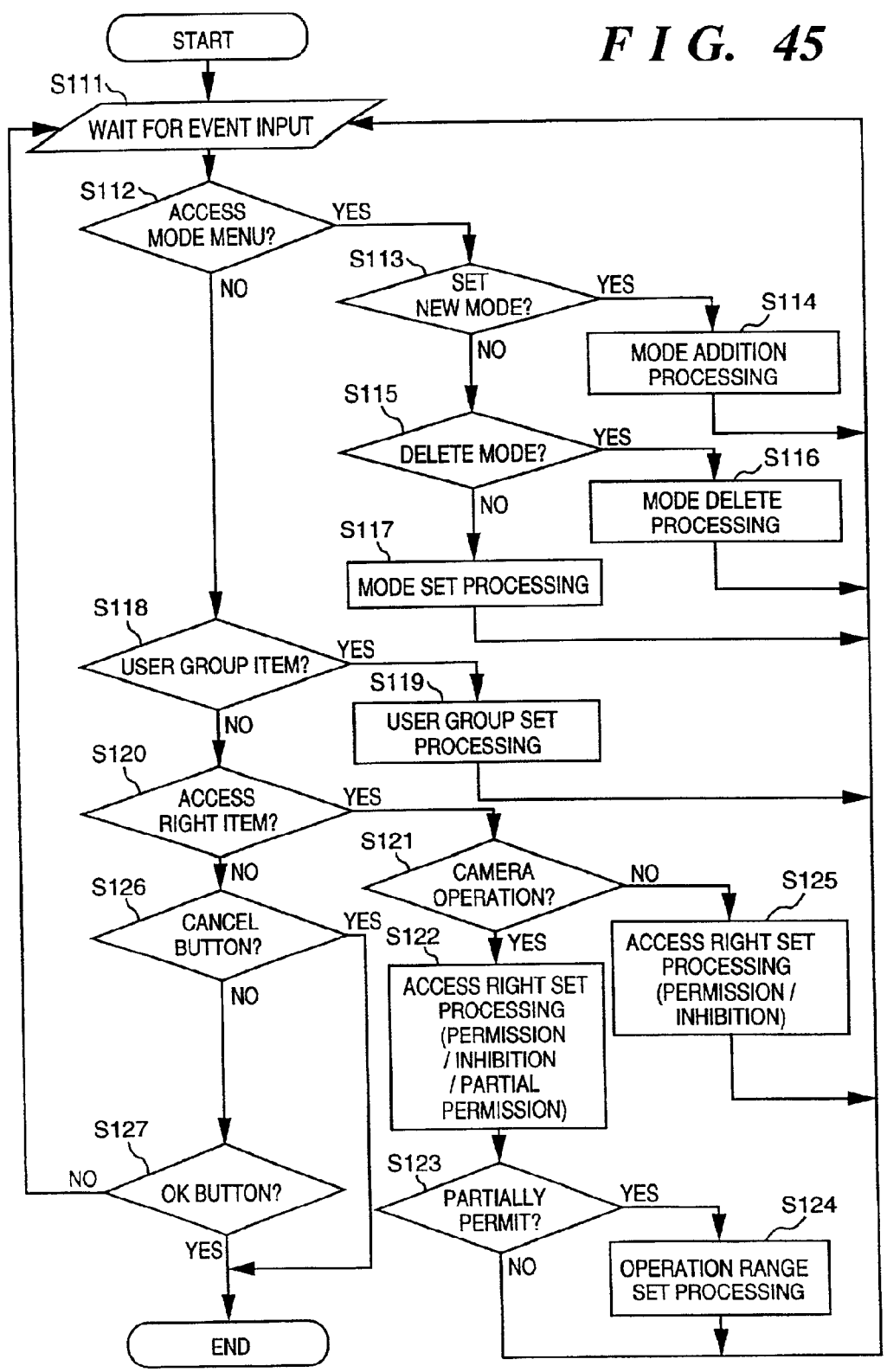
FIG. 45 is a flow chart showing processing of setting an access right.

A procedure of setting an access right will be described below. FIGS. 32 to 43 show an example of GUI for setting an access right. FIGS. 44 and 45 are flow charts showing the accompanying processing.

To set or change an access right, the user selects an objective camera apparatus from the camera list displayed in the camera status display portion 284 (FIG. 22) on the image display operation screen 280 which is displayed by the camera control client 272, and clicks the access right set button 304. In accordance with the click on the access right set button 304, the camera control client 272 communicates with the camera management server 268. If the user who has desired to set or change an access right is the owner of that camera apparatus, i.e., the camera owner, the camera control client 272 first pops up an access control panel shown in FIG. 32.

When the access control panel in FIG. 32 pops up, a current access right set state is displayed. When this panel is displayed for the first time after the system is started, i.e., when there is no information concerning access right setting (S91), the camera control client 272 reads in an access right set file which is preset by the installer of the camera apparatus (S92). If this file also cannot be found, the camera apparatus is automatically set in the public mode described previously. If the mode of the camera apparatus is later changed to the private mode, the individual access modes described earlier are set in the standard manner as illustrated in FIGS. 26A, 26B, and 26C, and all users are made belong to the user group of "OTHERS".

The access control panel in FIG. 32 displays a camera name list box, radio buttons for alternatively selecting the public mode or the private mode, an access mode box, an access right set button, an OK button, and a cancel button (S93). The user can complete the setting by using the OK button and cancel the setting by using the cancel button.

The camera name list box displays the members (camera names) of the camera group to which the selected camera apparatus belongs. Information pertaining to the camera group is also stored in the access right set file. If this file does not exist, the setting of the camera group is initialized to allow only one camera apparatus to belong to the group. After the above display is performed (S93), an event input waiting loop starts (S94).

When the user double-clicks one camera name listed in the camera name list box (S95), a camera information panel shown in FIG. 33 pops up to display camera information (S96).

The camera information panel displays the camera name, the connected host name, the camera owner name, the log-in user name, and the camera installer name. When the user clicks a camera delete button on the camera information panel, the corresponding camera apparatus is deleted from the corresponding camera group, and the camera information panel pops down. The deleted camera apparatus forms one independent camera group. Assume that at least one camera apparatus belongs to each camera group.

To register a camera apparatus to a camera group, the user need only select a desired camera apparatus from the camera list displayed in the camera status display portion 284 (FIG. 22) and drag-and-drop the selected camera apparatus into the camera name list box. To add a camera apparatus to a camera group, the camera control client 272 communicates with the camera management server 268 to check whether the user is the owner of the camera apparatus. Thereafter, the camera apparatus added to the camera group is set to have the same access right as the camera group.

After the above operation, the user clicks the lowermost close button on the camera information panel, and the camera information panel pops down.

If the user clicks the radio button for selecting the public mode or the private mode of a camera apparatus (or a camera group) (S97), public/private set processing is executed (S98). If the public mode is selected, no access right can be set as described above, and so all users can freely receive video/audio information from the camera apparatus and remotely control the camera apparatus. In this public mode, the access mode box and the access right set button on the access control panel (S32) are grayed out so as not to accept an input or a mouse operation any longer. That is, even if an event occurs, it is determined in step S99 that processing concerning the access mode menu (S100) and processing concerning the access right set button (S102) are not to be executed. If the private mode is selected, on the other hand, the access mode box and the access right set button are made operable.

If the user wants to change the access mode, the user clicks the access mode box (S100). Consequently, a pop-up list as shown in FIG. 34 is displayed, and the user can select one of a plurality of preset access modes (S101).

To perform finer setting, the user clicks the access right set button (S102). Consequently, an access right set panel shown in FIG. 35 pops up. The access right set panel in FIG. 35 consists of a camera owner name box, an access mode box, an access right display change portion, a cancel button, a default button, and an OK button. That is, on this access right set panel the user can set details of the access right in each access mode (S103). The user can also set a user group and add or delete an access mode. Note that the access mode when the access right set panel pops up is the same as the access mode on the access control panel.

FIG. 45 is a detailed flow chart of the processing on the access right set panel. When the user clicks the access mode box (S112), a pop-up list shown in FIG. 37 appears, and the user can change the access mode by an operation similar to the operation in the case of the pop-up list shown in FIG. 34 and can add or delete the access mode (S113 to S117). In adding the access mode, a new access mode set dialogue panel as illustrated in FIG. 38 pops up. In deleting the access mode, an access mode delete dialogue panel as illustrated in FIG. 39 pops up.

The access right display change portion displays and sets each access right in an access mode designated in the access mode box. In the access right display change portion, the abscissa indicates an access right to each of voice reception, an image reception, and a camera operation, and the ordinate indicates a user group.

Figure 40:
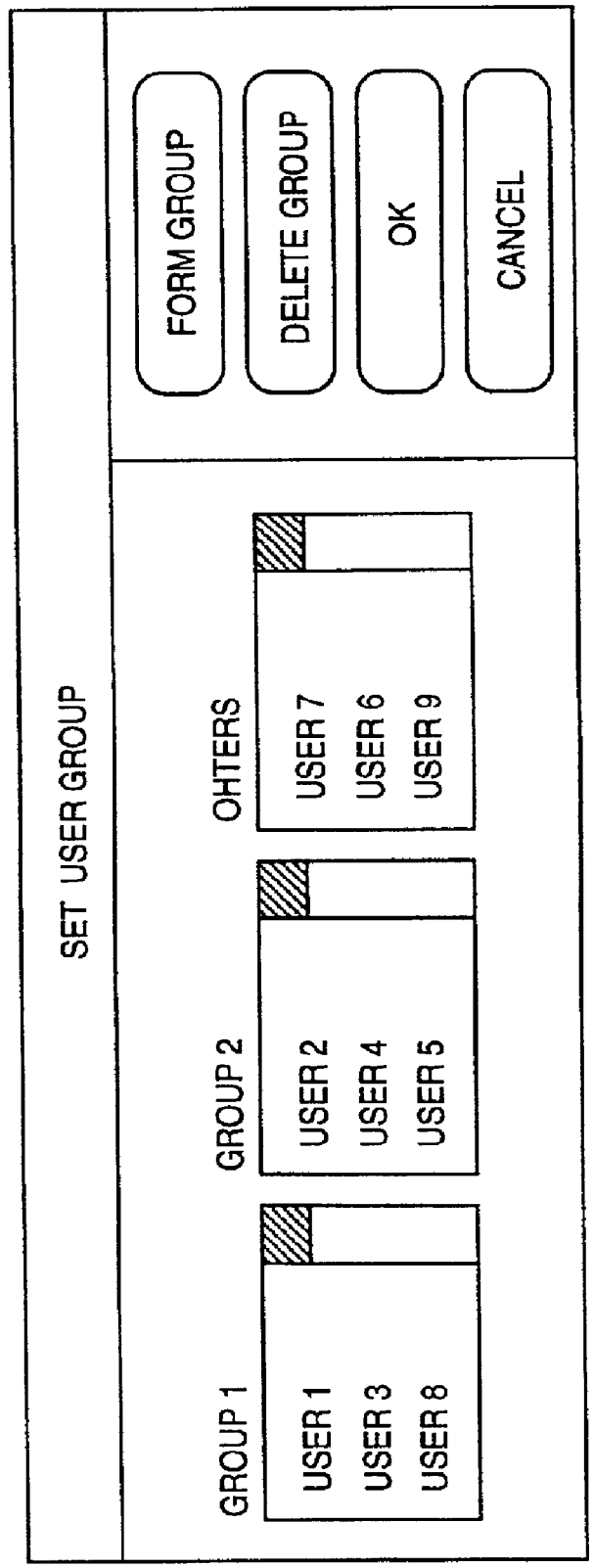
FIG. 40 is a view showing a user group set panel.
Figure 41:
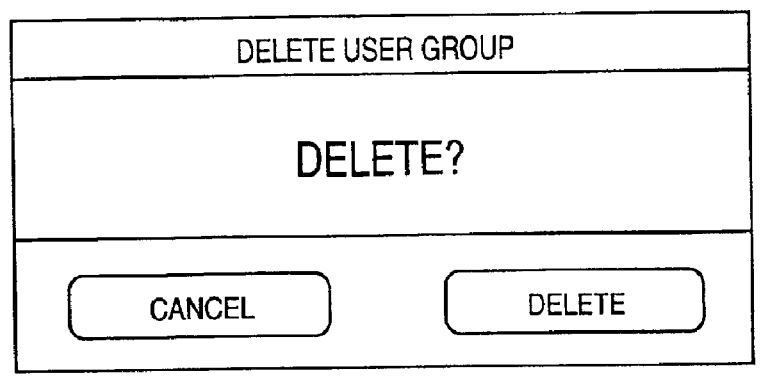
FIG. 41 is a view showing a user group delete dialogue panel.
Figure 42:
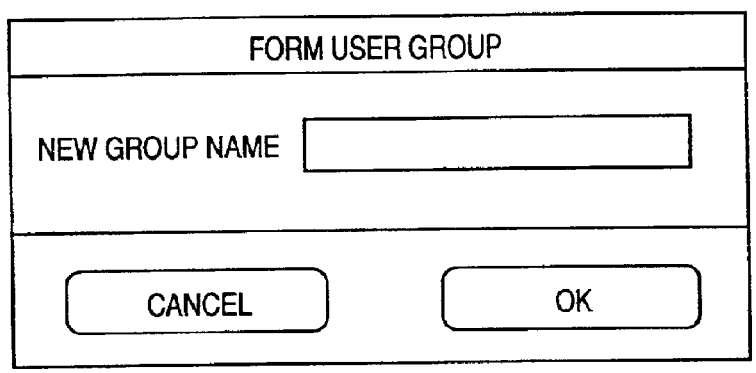
FIG. 42 is a view showing a user group formation dialogue panel.
Figure 43:
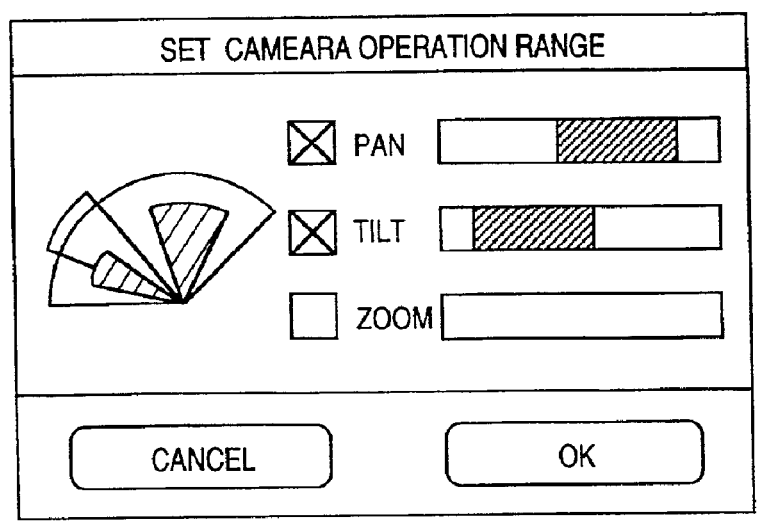
FIG. 43 is a view showing a camera operation range set panel.

When the user clicks the column of the user group in the access right display change portion (S118), a user group set panel including a list of user group members as shown in FIG. 40 is displayed. The user can add or delete an arbitrary user (member) to or from an arbitrary user group by dragging-and-dropping a member belonging to a certain user group into another user group box. To add a new user group, the user clicks a group formation button. To delete a user group, the user selects the user group to be deleted and clicks a group delete button (S119). In adding a user group, a user group formation dialogue box as shown in FIG. 42 pops up. In deleting a user group, a user group delete dialogue box as shown in FIG. 41 pops up.

When the user clicks the access right display in the access right display change portion (S120), he or she can change each access right (S121 to S125). An access right that can be set is in the form of a pop-up list as shown in FIG. 36. One of two items "permitted" and "inhibited" can be selected for voice reception and image reception (S125). One of three items "permitted", "partially permitted", and "inhibited" can be selected for a camera operation (S122). To partially permit a camera operation (S123), a camera operation range set panel as in FIG. 43 pops up, and an operation range can be set for each of operation items, pan, tilt, and zoom (S124).

When completing the above setting, the user clicks the OK button on the access right set panel (FIG. 35), completing the setting of access rights (S127).

After the user completes all the processing concerning the setting of access rights, he or she clicks the OK button on the access control panel shown in FIG. 32 (S105, FIG. 44), completing the setting of access rights. After the completion of the setting, the camera control client 272 informs the camera management server 268 of the new setting of access rights (S106 and S51) and updates the access right set file (S107). If the access right to a camera operation is "particularly permitted", the camera control client 272 informs the camera control server 266 of the new setting of access rights (S106 and S51). The camera management server 268 updates the access right set list (S45), and the camera control server 266 updates the camera operation range information (S47).

In this embodiment as has been described above, to protect the privacy of a log-in user as the owner of a camera apparatus, it is possible to realize fine setting meeting the demand of the user at all times. Additionally, in a location where a camera apparatus connected to a network is installed, it is possible to prevent a leak of confidential information through the camera apparatus. Also, the operability is improved by the use of the user interface which sets access rights in a hierarchical manner from rougher setting to finer setting.

<Other Embodiment>

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

What is claimed is:

1. A camera apparatus control system comprising:
   a camera apparatus capable of being operated via a network in operation which is at least one of panning, tilting and zooming of the camera apparatus; and
   a manager, arranged to manage the operation on the basis of first and second management information stored in a table where the first management information indicates limitation information relating to the operation for each user and the second management information indicates whether or not the camera apparatus is operated by a user,
   wherein said manager permits a user, who is not limited from performing operation via the network by the first management information, to operate the camera apparatus and receive a current image acquired by the camera apparatus if the second management information indicates that the camera apparatus is not being operated by another user,
   and said manager prohibits the user to operate the camera apparatus, and permits the user to have access to the camera apparatus for receiving a current image acquired by the camera apparatus if the second management information indicates that the camera apparatus is operated via the network by another user.

2. The system according to claim 1, wherein one of a first mode in which all operations of said camera apparatus is permitted, a second mode in which all the operations are inhibited, and a third mode in which the operations are permitted within a predetermined range can be set by the first management information for each user.

3. The system according to claim 2, wherein a plurality of different operation ranges can be set in the third mode.

4. The system according to claim 1, further comprising:
a controller, arranged to control an action of said camera apparatus and instructing said manager to enter or delete registration of said camera apparatus in or from the first management information; and
an operation limiter arranged to instruct said manager to update the limitation information of a camera apparatus to be controlled by said controller.

5. The system according to claim 4, further comprising an operating section arranged to request said controller to permit an operation of said camera apparatus via said network in accordance with designation from a user and management by said manager.

6. The system according to claim 5, wherein said operating section can obtain registration information indicating a registration state of a camera apparatus contained in the first management information via said network.

7. The system according to claim 6, wherein said operating section can instruct said manager via said network to change an access right of a user to a camera apparatus registered in the registration information.

8. A control method for a camera apparatus capable of being operated via a network, comprising the steps of:
setting first limitation information for limiting operation via the network of the camera apparatus for each user where the operation is at least one of panning, tilting and zooming of the camera apparatus;
setting second limitation information for indicating whether or not the camera apparatus is operated by a user; and
managing the operation by a user who receives a current image acquired by the camera apparatus on the basis of the set first and second limitation information,
wherein in the managing step, one of the user, who is not limited from performing operation via the network by the first limitation information, can obtain permission to operate the camera apparatus and receive a current image acquired by the camera apparatus if the second limitation information indicates that the camera apparatus is not being operated by another user,
and in the managing step, the one of the user can not obtain permission to operate the camera apparatus and can obtain permission to have access to the camera apparatus for receiving a current image acquired by the camera apparatus if the second management information indicates that the camera apparatus is operated via the network by another user.

9. The method according to claim 8, further comprising the steps of:
requesting remote operation of the camera apparatus via the network in accordance with a designation from the user and the management information; and
controlling an action of the camera apparatus on the basis of the requested remote operation and the set first limitation information.

10. The method according to claim 9, further comprising the steps of:
acquiring the first limitation information for the camera apparatus via the network; and changing the first limitation information of the camera apparatus via the network.

11. The method according to claim 8, further comprising the steps of:
controlling an action of the camera apparatus instructing the managing step to enter or delete registration of the camera apparatus in or from the first management information; and
requesting the controlling step to permit remote operation of the camera apparatus vis the network in accordance with a designation from a user and the management information.

12. The method according to claim 11, further comprising the steps of:
obtaining registration information indicating a registration state of a camera apparatus contained in the management information via the network; and
instructing the managing step via the network to change the first management information of the registered camera apparatus to change the limitation information.

13. The method according to claim 8, wherein when a plurality of camera apparatuses are connected to a terminal connected to the network, the plurality of camera apparatuses can be grouped and the first limitation information can be set in units of groups.

14. The method according to claim 8, wherein the first limitation information is set for each user of a terminal connected to the network.

15. The method according to claim 14, wherein the users can be grouped and the first limitation information can be set in units of groups.

16. The method according to claim 15, wherein a plurality of access modes having different first limitation information can be set and one of the plurality of access modes can be selected for the user group.

17. The system according to claim 1, wherein the first management information contains providing information which indicates permission/prohibition for receiving an image provided by the camera apparatus for each user, and said manager manages sending an image provided by the camera apparatus to the user based on the providing information.

18. The system according to claim 1, wherein the first management information contains providing information which indicates permission/prohibition for receiving sound provided by a microphone equipped for the camera apparatus for each user, and said manager manages sending sound provided by the microphone to the user based on the providing information.

19. A control system controlling a camera apparatus which is operated via a network where the operation is at least one of panning, tilting and zooming of the camera apparatus, comprising:
an output section, arranged to output a current image acquired by the camera apparatus to at least one user via the network;
a manager arranged to manage first and second management information stored in a table where the first management information defines limits of the operation for each user and the second management information indicates whether or not the camera apparatus is operated by a user; and
a controller, arranged to control an action of the camera apparatus within the limits of the operation via the network corresponding to the user who receives the current image and requires the operation,
wherein said controller permits a user, who is not limited from performing operation by the first management information, to operate the camera apparatus and receive the current image if the second management information indicates that the camera apparatus is not being operated by another user, and said controller prohibits the user to operate the camera apparatus, and permits the user to have access to the camera apparatus for receiving the current image if the second management information indicates that the camera apparatus is operated via the network by another user.

20. A control apparatus controlling a camera comprising:

a controller, arranged to control an action of a connected camera based on a received signal which requires operation of the connected camera through a network where the operation is at least one of panning, tilting and zooming, and a manager, arranged to manage the action of the connected camera based on first and second management information stored in a table where the first management information indicates limitation of the operation for each user and the second management information indicates whether or not the camera apparatus is operated by a user, wherein said manager permits a user, who is not limited from performing operation via the network by the first management information, to operate the camera apparatus and receive a current image acquired by the camera apparatus if the second management information indicates that the camera apparatus is not being operated by another user, and said manager prohibits the user to operate the camera apparatus, and permits the user to have access to the camera apparatus for receiving a current image acquired by the camera apparatus if the second management information indicates that the camera apparatus is operated via the network by another user.

21. A control apparatus controlling a camera comprising:

a controller, arranged to control an action of a connected camera based on a received signal which requires operation of the connected camera through a network, the operation being at least one of panning, tilting and zooming;

an output section, arranged to output a current image acquired by the connected camera to at least one user via the network;

a manager, arranged to manage first and second management information stored in a table where the first management information defines limits of the operation for each user and the second management information indicates whether or not the connected camera is operated by a user; and a controller, arranged to control an action of the connected camera within the limits of the operation via the network corresponding to the user who receives the current image and requires the operation, wherein said controller permits a user, who is not limited from performing operation by the first management information, to operate the connected camera and receive the current image if the second management information indicates that the connected camera is not being operated by another user, and said controller prohibits the user to operate the camera, and permits the user to have access to the camera for receiving the current image if the second management information indicates that the camera is operated via the network by another user.

22. A control method for a camera apparatus which is operated via a network where the operation is at least one of panning, tilting and zooming of the camera apparatus, comprising the step of:

outputting a current image acquired by the camera apparatus to at least one user via the network;

managing first and second management information stored in a table where the first management information defines limits of the operation for each user and the second management information indicates whether or not the camera apparatus is operated by a user; and controlling an action of the camera apparatus within the limits of the operation via the network corresponding to the user who receives the current image and requires the operation, wherein in the controlling step, a user, who is not limited from performing operation by the first management information, is permitted to operate the camera apparatus and receive the current image if the second management information indicates that the camera apparatus is not being operated by another user, and the user is prohibited to operate the camera apparatus, and is permitted to have access to the camera apparatus for receiving the current image if the second management information indicates that the camera apparatus is operated via the network by another user.

23. A control apparatus for controlling a camera connected to said apparatus, comprising:

a controller, arranged to control an action of the camera based on a received signal which requires an operation of the camera; and a memory, arranged to store first management information which indicates limitation of operation of the camera for each user and second information which indicates whether the camera is operated by a user or not, wherein said controller permits a user, who is not limited from performing operation via a network by the first management information, to operate the camera and receive a current image acquired by the camera if the second management information indicates that the camera is not being operated by another user, and said controller prohibits the user to operate the camera, and permits the user to have access to the camera for receiving a current image acquired by the camera if the second management information indicates that the camera is operated via the network by another user.

24. The apparatus according to claim 23, wherein the operation of the camera includes at least one of panning, tilting or zooming operation of the camera.

25. The apparatus according to claim 23, wherein the first management information includes a range of the operation of the camera for each user.

26. The apparatus according to claim 23, wherein the first management information can be set in a unit of groups including plural users.

27. A control method of controlling a camera based on first management information which indicates limitation of operation of the camera for each user and second information which indicates whether the camera is operated by a user or not, comprising the steps of:

permitting a user, who is not limited from performing operation via a network by the first management information, to operate the camera and receive a current image acquired by the camera if the second management information indicates that the camera is not being operated by another user; and prohibiting the user to operate the camera, and permitting the user to have access to the camera for receiving a current image acquired by the camera if the second management information indicates that the camera is operated via the network by another user.

28. The method according to claim 27, wherein the operation of the camera includes at least one of panning, tilting or zooming operation of the camera.

29. The method according to claim 27, wherein the first management information includes a range of the operation of the camera for each user.

30. The method according to claim 27, wherein the first management information can be set in a unit of groups including plural users.

31. A computer program product comprising a computer readable medium storing a computer program code, for a control method of controlling a camera based on first management information which indicates limitation of operation of the camera for each user and second information which indicates whether the camera is operated by a user or not, comprising process procedure code for:

permitting a user, who is not limited from performing operation via a network by the first management information, to operate the camera and receive a current image acquired by the camera if the second management information indicates that the camera is not being operated by another user; and prohibiting the user to operate the camera, and permitting the user to have access to the camera for receiving a current image acquired by the camera if the second management information indicates that the camera is operated via the network by another user.

32. The product according to claim 31, wherein the operation of the camera includes at least one of panning, tilting or zooming operation of the camera.

33. The procedure according to claim 31, wherein the first management information includes a range of the operation of the camera for each user.

34. The procedure according to claim 31, wherein the first management information can be set in a unit of groups including plural users.

* * * * *

UNITED STATES PATENT AND TRADEMARK OFFICE
CERTIFICATE OF CORRECTION

PATENT NO. : 7,079,177 B2
APPLICATION NO. : 09/894233
DATED : June 18, 2006
INVENTOR(S) : Hiroshi Okazaki It is certified that error appears in the above-identified patent and that said Letters Patent is hereby corrected as shown below:

In the Title (54):

Delete "REMOTE CONTROL SYSTEM AND ACCESS CONTROL METHOD FOR INFORMATION INPUT APPARATUS WITH LIMITATION BY USER FOR IMAGE ACCESS AND CAMEMREMOTE CONTROL" and insert therefor --REMOTE CONTROL SYSTEM AND ACCESS CONTROL METHOD FOR INFORMATION INPUT APPARATUS WITH LIMITATION BY USER FOR IMAGE ACCESS AND CAMERA REMOTE CONTROL--

In the Specification:

Col. 7, line 46, delete "However, it a single" and insert therefore -- However, if a single --

Col. 10, line 35, delete "An large taken" and insert therefore -- An image taken --

UNITED STATES PATENT AND TRADEMARK OFFICE
CERTIFICATE OF CORRECTION

PATENT NO. : 7,079,177 B2
APPLICATION NO. : 09/894233
DATED : June 18, 2006
INVENTOR(S) : Hiroshi Okazaki It is certified that error appears in the above-identified patent and that said Letters Patent is hereby corrected as shown below:

In the Claims:

Claim 11, Col. 26, line 3: Insert ";" between "apparatus" and "instructing", and shift "instructing..." to another line as another element.

Claim 11, line 8: delete "vis" and insert therefore -- via --

Signed and Sealed this

Seventh Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,079,177 B2
APPLICATION NO. : 09/894233
DATED : October 12, 2006
INVENTOR(S) : Hiroshi Okazaki Page 1 of 1

It is certified that error appears in the above-identified patent and that said Letters Patent is hereby corrected as shown below:

<u>In the front page of the Letter Patent:</u>

Delete "Nance, Barry, Introduction to Networking, pp. 22, 37, 94-95, 101-13, 1993" and insert therefore --Nance, Barry, Introduction to Networking, pp. 22, 37, 94-95, 101-103, 1993--

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,079,177 B2
APPLICATION NO. : 09/894233
DATED : July 18, 2006
INVENTOR(S) : Hiroshi Okazaki It is certified that error appears in the above-identified patent and that said Letters Patent is hereby corrected as shown below:

<u>In the front page of the Letter Patent:</u>

Delete "Nance, Barry, Introduction to Networking, pp. 22, 37, 94-95, 101-13, 1993" and insert therefore --Nance, Barry, Introduction to Networking, pp. 22, 37, 94-95, 101-103, 1993--

This certificate supersedes Certificate of Correction issued December 12, 2006.

Signed and Sealed this

Ninth Day of January, 2007

JON W. DUDAS
*Director of the United States Patent and Trademark Office*